(12) United States Patent
Hrastnik

(10) Patent No.: US 11,914,575 B2
(45) Date of Patent: Feb. 27, 2024

(54) DATA PERSISTENCY MODELS FOR SOFTWARE APPLICATIONS

(71) Applicant: SAP SE, Walldorf (DE)

(72) Inventor: Jan Hrastnik, Sandhausen (DE)

(73) Assignee: SAP SE, Walldorf (DE)

( * ) Notice: Subject to any disclaimer, the term of this patent is extended or adjusted under 35 U.S.C. 154(b) by 189 days.

(21) Appl. No.: 17/240,795

(22) Filed: Apr. 26, 2021

(65) Prior Publication Data

US 2022/0342870 A1    Oct. 27, 2022

(51) Int. Cl.
*G06F 16/23*    (2019.01)

(52) U.S. Cl.
CPC ................ *G06F 16/2379* (2019.01)

(58) Field of Classification Search
CPC .................................................. G06F 16/2379
USPC ........................................................... 707/703
See application file for complete search history.

(56) References Cited

U.S. PATENT DOCUMENTS

| | | | | |
|---|---|---|---|---|
| 2007/0214184 A1* | 9/2007 | Church | ................. | G06F 16/217 |
| 2012/0095973 A1* | 4/2012 | Kehoe | ....................... | G06F 8/70 |
| | | | | 707/694 |
| 2013/0042219 A1* | 2/2013 | Said | ........................ | G06F 8/436 |
| | | | | 717/103 |
| 2014/0006306 A1* | 1/2014 | Koshy | .................... | G06Q 10/10 |
| | | | | 705/345 |
| 2017/0039040 A1* | 2/2017 | Nayak | ..................... | G06Q 10/06 |
| 2017/0068718 A1* | 3/2017 | Schaffer | ................ | G06F 16/258 |
| 2019/0349357 A1* | 11/2019 | Shukla | ..................... | H04L 63/20 |
| 2021/0004209 A1* | 1/2021 | Holt | ......................... | G06F 8/10 |
| 2022/0012426 A1* | 1/2022 | Ziemer | ................. | G06F 16/248 |
| 2022/0109861 A1* | 4/2022 | Hannuksela | ........... | H04N 19/70 |
| 2022/0345518 A1* | 10/2022 | Sgobba | ................... | H04L 67/10 |

\* cited by examiner

*Primary Examiner* — Amy Ng
*Assistant Examiner* — Antonio J Caiado
(74) *Attorney, Agent, or Firm* — Fountainhead Law Group P.C.

(57) ABSTRACT

Some embodiments provide a non-transitory machine-readable medium that stores a program. The program receives a metadata model definition comprising a set of entity definitions specifying a set of entities, a set of semantic key definitions specifying a set of semantic keys associated with the set of entities, and a set of relationship definitions specifying a set of relationships between the set of entities. The set of semantic keys are configured to be used by an application to refer to the set of entities. The program further determines a set of technical keys for the set of entities. The set of technical keys are configured to be used by the device to refer to the set of entities. The program also stores the metadata model definition and the set of technical keys in a set of records.

20 Claims, 20 Drawing Sheets

| Entity | Elements |
|---|---|
| SalesOrderHeader | [ { "ID":"SalesOrder", <br> "Type":"String", <br> "MaxLength":10 <br> }, <br> { "ID":"SoldToParty", <br> "Type":"EntityIdentity(Customer)" <br> }, <br> { "ID":"ControllingArea", <br> "Type":"EntityIdentity(ControllingArea)" <br> }, <br> { "ID":"CostCenter", <br> "Type":"EntityIdentity(CostCenter)" <br> }, <br> { "ID":"SalesOrderDate", <br> "Type":"Date", <br> "MaxLength":8 <br> },... <br> ] |
| CostCenter | [ { "ID":"CostCenter", <br> "Type":"String", <br> "MaxLength":10 <br> }, <br> { "ID":"ControllingArea", <br> "Type":"EntityIdentity(ControllingArea)" <br> }, <br> { "ID":"ValidityEndDate", <br> "Type":"Date", <br> "MaxLength":8 <br> }, <br> ... <br> ] |

FIG. 3

| Entity | Semantic Identity Keys | Semantic Validity Keys |
|---|---|---|
| SalesOrderHeader | [ { "ID": "SemanticKey",<br>"Elements": ["SalesOrder"],<br>"UniquenessConstraint":"Unique"<br>},<br>] | None |
| CostCenter | [ { "ID": "PrimaryIdentityKey",<br>"Elements": ["ControllingArea", "CostCenter"],<br>"UniquenessConstraint":"Unique"<br>},<br>{ "ID": "AlternativeIdentityKey",<br>"Elements": ["CostCenterUniqueID"],<br>"UniquenessConstraint":"Unique"<br>},<br>] | [ { "ID": "ValidityPeriodEndKey",<br>"Elements": ["ValidityEndDate"],<br>"UniquenessConstraint":"Unique"<br>},<br>{ "ID": "ValidityPeriodStartKey",<br>"Elements": ["ValidityStartDate"],<br>"UniquenessConstraint":"Unique"<br>},<br>] |

| IdentityID | ValidityID | TransactionID | Lifecycle-Status-Code | Data |
|---|---|---|---|---|
| 23 | 53 | 99 | 1 | "Type":<br>[ { "ID":"SalesOrder",<br>  "Type":"String",<br>  "MaxLength":10,<br>},<br>{ "ID":"SoldToParty",<br>  "Type":"EntityIdentity(Customer)"<br>},<br>{ "ID":"ControllingArea",<br>  "Type":"EntityIdentity(ControllingArea)"<br>},<br>{ "ID":"CostCenter",<br>  "Type":"EntityIdentity(CostCenter)"<br>},<br>{ "ID":"SalesOrderDate",<br>  "Type":"Date",<br>  "MaxLength":8<br>},<br>] |
| 60 | 32 | 103 | 1 | "Type":<br>[ { "ID":"CostCenter",<br>  "Type":"String",<br>  "MaxLength":10,<br>},<br>{ "ID":"ControllingArea", ... },<br>{ "ID":"ValidityEndDate",<br>  "Type":"Date",<br>  "MaxLength":8,<br>}, |

505 (first row), 510 (second row), 500 (table)

FIG. 5

| IdentityID | ValidityID | TransactionID | Lifecycle-Status-Code | Data |
|---|---|---|---|---|
| ... | | | | |
| 23 | 53 | 113 | 1 | "Type": [ { "ID":"SalesOrder" "Type":"String", "MaxLength":10, }, { "ID":"SoldToParty", "Type":"EntityIdentity(Customer)"}, { "ID":"ControllingArea", "Type":"EntityIdentity(ControllingArea)"} { "ID":"CostCenter", "Type":"EntityIdentity(CostCenter)" }, { "ID":"SalesOrderDate", "Type":"Date", "MaxLength":8 }, { "ID":"TotalNetAmount", ... }, { "ID":"TransactionCurrency", "Type":"EntityIdentity(Currency)"}, ] ... |
| 77 | 51 | 29 | 1 | "Type": [ { "ID":"Customer", ... }, ... ], ... |
| 98 | 17 | 12 | 1 | "Type": [ { "ID":"Currency", ... }, ... ], ... |
| ... | | | | |

FIG. 7

| Entity | Semantic Identity Keys | Semantic Validity Keys |
|---|---|---|
| Customer | [{"ID":"SemanticKey", "Elements":["Customer"], "UniquenessConstraint":"Unique" }] | None |
| Currency | [{"ID":"SemanticKey", "Elements":["Currency"], "UniquenessConstraint":"Unique" }] | None |

| IdentityID | ValidityID | TransactionID | Lifecycle-Status-Code | Data |
|---|---|---|---|---|
| 6721 | null | 923 | 0 | { "SalesOrder":"4711",<br>"SoldToParty":null,<br>"ControllingArea":null,<br>"CostCenter":null,<br>"SalesOrderDate":null,<br>"TotalNetAmount":null,<br>"TransactionCurrency":null,<br>...<br>} |

| IdentityID | ValidityID | TransactionID | Lifecycle-Status-Code | Data |
|---|---|---|---|---|
| 6721 | null | 924 | 0 | { "SalesOrder":"4711",<br>"SoldToParty":null,<br>"ControllingArea":null,<br>"CostCenter":null,<br>"SalesOrderDate":null,<br>"TotalNetAmount":null,<br>"TransactionCurrency":{"Currency":"EER"},<br>...<br>} |

| IdentityID | ValidityID | TransactionID | Lifecycle-Status-Code | Data |
|---|---|---|---|---|
| 6721 | null | 1027 | 0 | { "SalesOrder":"4711",<br>"SoldToParty":null,<br>"ControllingArea":null,<br>"CostCenter":null,<br>"SalesOrderDate":null,<br>"TotalNetAmount":null,<br>"TransactionCurrency":{"Currency":"EUR"},<br>...<br>} |

| IdentityID | ValidityID | TransactionID | Lifecycle-Status-Code | Data |
|---|---|---|---|---|
| 6721 | null | 1064 | 1 | {"SalesOrder":"4711",<br>"SoldToParty":null,<br>"ControllingArea":null,<br>"CostCenter":null,<br>"SalesOrderDate":null,<br>"TotalNetAmount":null,<br>"TransactionCurrency":{"IdentityID":"9823"},<br>...<br>} |

| IdentityID | ValidityID | TransactionID | Lifecycle-Status-Code | Data |
|---|---|---|---|---|
| 6721 | null | 1066 | 0 | {"SalesOrder":"4711",<br>"SoldToParty":{"Customer":"ACME"},<br>"ControllingArea":null,<br>"CostCenter":null,<br>"SalesOrderDate":null,<br>"TotalNetAmount":null,<br>"TransactionCurrency":{"IdentityID":"9823"},<br>...<br>} |

| IdentityID | ValidityID | TransactionID | Lifecycle-Status-Code | Data |
|---|---|---|---|---|
| 6721 | null | 1067 | 1 | {"SalesOrder":"4711",<br>"SoldToParty":{"IdentityID":"3488"},<br>"ControllingArea":null,<br>"CostCenter":null,<br>"SalesOrderDate":null,<br>"TotalNetAmount":null,<br>"TransactionCurrency":{"IdentityID":"9823"},<br>...<br>} |

| IdentityID | ValidityID | TransactionID | Lifecycle-Status-Code | Data |
|---|---|---|---|---|
| 6721 | null | 1064 | 2 | ... |

| IdentityID | ValidityID | TransactionID | Lifecycle-Status-Code | Data |
|---|---|---|---|---|
| 6721 | null | 1068 | 0 | { "SalesOrder":"4711",<br>"SoldToParty":{"IdentityID":"3488"},<br>"ControllingArea":null,<br>"CostCenter":null,<br>"SalesOrderDate":null,<br>"TotalNetAmount":null,<br>"TransactionCurrency":{"Currency":"USD"},<br>...<br>} |

| IdentityID | ValidityID | TransactionID | Lifecycle-Status-Code | Data |
|---|---|---|---|---|
| 6721 | null | 1069 | 1 | { "SalesOrder":"4711",<br>"SoldToParty":{"IdentityID":"3488"},<br>"ControllingArea":null,<br>"CostCenter":null,<br>"SalesOrderDate":null,<br>"TotalNetAmount":null,<br>"TransactionCurrency":{"IdentityID":"467"},<br>...<br>} |

| IdentityID | ValidityID | TransactionID | Lifecycle-Status-Code | Data |
|---|---|---|---|---|
| 6721 | null | 1067 | 2 | ... |

| IdentityID | ValidityID | TransactionID | Lifecycle-Status-Code | Data | |
|---|---|---|---|---|---|
| 6721 | null | 1064 | 2 | 1:"4711",7:1"9823" | 915 |
| 6721 | null | 1067 | 2 | 2:1"3488" | 925 |
| 6721 | null | 1069 | 1 | 1:"4711",2:1"3488",7:1"467" | 935 |

1005

| IdentityID | ValidityID | TransactionID | Lifecycle-Status-Code | Data | |
|---|---|---|---|---|---|
| 6721 | null | 1064 | 3 | | 915 |
| 6721 | null | 1067 | 2 | 1:"4711",2:1"3488",7:1"9823" | 925 |
| 6721 | null | 1069 | 1 | 1:"4711",2:1"3488",7:1"467" | 935 |

1010

| IdentityID | ValidityID | TransactionID | Lifecycle-Status-Code | Data | |
|---|---|---|---|---|---|
| 6721 | null | 1064 | 3 | | 915 |
| 6721 | null | 1067 | 2 | 1:"4711",2:1"3488",7:1"9823" | 925 |
| 6721 | null | 1069 | 2 | 7:1"467" | 935 |
| 6721 | null | 1072 | 4 | | 1015 |

1100

1105

| IdentityID | ValidityID | TransactionID | Lifecycle-Status-Code | Data |
|---|---|---|---|---|
| ... | | | | |
| 23 | 45 | 113 | 2 | "Type": [{"ID":"SalesOrder" "Type":"String", "MaxLength":10, }, {"ID":"SoldToParty", ...}, ... ], ... |
| 23 | 45 | 9234 | 1 | "Type": [{"ID":"SalesOrder" "Type":"String", "MaxLength":20, }, {"ID":"SoldToParty", ...}, ... ], "TransformationRules": [{"SalesOrder","lpad($predecessor.this.SalesOrder,20, '0')",...} ... |

| IdentityID | ValidityID | TransactionID | Lifecycle-Status-Code | Data |
|---|---|---|---|---|
| ... | | | | |
| 1405 → 6721 | null | 3547 | 1 | "SalesOrder","0000004711",... |
| 1410 → 6722 | null | 4123 | 1 | "SalesOrder","0000004712",... |
| ... | | | | |

| IdentityID | ValidityID | TransactionID | Lifecycle-Status-Code | Data |
|---|---|---|---|---|
| ... | | | | |
| 1405 → 6721 | null | 3547 | 2 | "SalesOrder","0000004711",... |
| 1415 → 6721 | null | 9507 | 1 | "SalesOrder","00000000000000004711",... |
| 1410 → 6722 | null | 4123 | 2 | "SalesOrder","0000004712",... |
| 1420 → 6722 | null | 9488 | 1 | "SalesOrder","00000000000000004712",... |
| ... | | | | |

DATA PERSISTENCY MODELS FOR SOFTWARE APPLICATIONS

BACKGROUND

The data used to drive software applications may be organized using a data model. Data models typically defines elements of data and how the elements relate to one another. Many different types of data models can be used to define the structure of a data model. For example, an entity-relationship model (ERM) data model is commonly used to define the structure of data models. Using an ERM data model approach, a data model can be defined by specifying the structure of different types of entities in the data model and the relationships between the different types of entities. For each entity, fields can be defined along with datatypes for the various fields. Once a data model is defined, it may be realized via a system, such as a database management system. Here, tables, columns, indices, keys, procedures, triggers, etc. may be specified to implement the data model.

SUMMARY

In some embodiments, a non-transitory machine-readable medium stores a program executable by at least one processing unit of a device. The program receives a metadata model definition comprising a set of entity definitions specifying a set of entities, a set of semantic key definitions specifying a set of semantic keys associated with the set of entities, and a set of relationship definitions specifying a set of relationships between the set of entities. The set of semantic keys are configured to be used by an application to refer to the set of entities. The program further determines a set of technical keys for the set of entities. The set of technical keys are configured to be used by the device to refer to the set of entities. The program also stores the metadata model definition and the set of technical keys in a set of records.

In some embodiments, the set of records may be a first set of records. The program may further receive a set of changes to the metadata model; modify the metadata model based on the set of changes to form a second metadata model definition; and store the second metadata model definition in a second set of records. The set of changes may include a modification to a datatype of a field of an entity in the set of entities and an addition of a transformation rule to the entity. The program may further apply the transformation rule to a first record of an instance of the entity in order; generate a second record of the instance of the entity; and store in the second record of the instance of the entity results generated from applying the transformation rules to the first record of the instance of the entity. The set of changes may include a replacement of a first field of an entity with a second field and an addition of a validity rule to the entity.

In some embodiments, storing the metadata model definition in the set of records may include storing each entity definition in the set of entity definitions in a record in the set of records. Determining the set of technical keys for the set of entities may include randomly determining a value for each entity in the set of entities.

In some embodiments, a method receives a metadata model definition comprising a set of entity definitions specifying a set of entities, a set of semantic key definitions specifying a set of semantic keys associated with the set of entities, and a set of relationship definitions specifying a set of relationships between the set of entities. The set of semantic keys are configured to be used by an application to refer to the set of entities. The method further determines a set of technical keys for the set of entities, wherein the set of technical keys are configured to be used by the device to refer to the set of entities. The method also stories the metadata model definition and the set of technical keys in a set of records.

In some embodiments, the set of records may be a first set of records. The method may further receive a set of changes to the metadata model; modifying the metadata model based on the set of changes to form a second metadata model definition; and storing the second metadata model definition in a second set of records. The set of changes may include a modification to a datatype of a field of an entity in the set of entities and an addition of a transformation rule to the entity. The method may further applying the transformation rule to a first record of an instance of the entity in order; generating a second record of the instance of the entity; and storing in the second record of the instance of the entity results generated from applying the transformation rules to the first record of the instance of the entity. The set of changes may include a replacement of a first field of an entity with a second field and an addition of a validity rule to the entity.

In some embodiments, storing the metadata model definition in the set of records may include storing each entity definition in the set of entity definitions in a record in the set of records. Determining the set of technical keys for the set of entities may include randomly determining a value for each entity in the set of entities.

In some embodiments, a system includes a set of processing units and a non-transitory machine-readable medium that stores instructions. The instructions cause at least one processing unit to receive a metadata model definition comprising a set of entity definitions specifying a set of entities, a set of semantic key definitions specifying a set of semantic keys associated with the set of entities, and a set of relationship definitions specifying a set of relationships between the set of entities. The set of semantic keys are configured to be used by an application to refer to the set of entities. The instructions further cause the at least one processing unit to determine a set of technical keys for the set of entities, wherein the set of technical keys are configured to be used by the device to refer to the set of entities. The instructions also cause the at least one processing unit to store the metadata model definition and the set of technical keys in a first set of records. The instructions further cause the at least one processing unit to receive a set of changes to the metadata model. The instructions also cause the at least one processing unit to modify the metadata model based on the set of changes to form a second metadata model definition. The instructions further cause the at least one processing unit to store the second metadata model definition in a second set of records.

In some embodiments, the set of changes may include a modification to a datatype of a field of an entity in the set of entities and an addition of a transformation rule to the entity. The instructions may further cause the at least one processing unit to apply the transformation rule to a first record of an instance of the entity in order; generate a second record of the instance of the entity; and store in the second record of the instance of the entity results generated from applying the transformation rules to the first record of the instance of the entity. The set of changes may include a replacement of a first field of an entity with a second field and an addition of a validity rule to the entity.

In some embodiments, storing the metadata model definition in the first set of records may include storing each entity definition in the set of entity definitions in a record in the first set of records. Determining the set of technical keys for the set of entities may include randomly determining a value for each entity in the set of entities.

The following detailed description and accompanying drawings provide a better understanding of the nature and advantages of various embodiments of the present disclosure.

BRIEF DESCRIPTION OF THE DRAWINGS

FIG. 3 illustrates example entity definitions according to some embodiments.

FIG. 4 illustrates example semantic key definitions according to some embodiments.

FIG. 5 illustrates example records of the entity definitions illustrated in FIG. 3 according to some embodiments.

FIG. 7 illustrates example records of entity definitions according to some embodiments.

FIG. 8 illustrates additional example semantic key definitions according to some embodiments.

FIGS. 9A-9J illustrate example records of an instance of an entity according to some embodiments.

FIG. 13 illustrates an example change to a metadata model definition using a transformation rule according to some embodiments.

FIGS. 14A and 14B illustrate the transformation rule illustrated in FIG. 13 applied to example records according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for providing data persistency models for software applications. In some embodiments, a computing system can receive a metadata model definition from a user of a client device. A metadata model definition may include definitions for describing a data model such as, for example, definitions of entities, definitions of relationships between the entities, definitions of various processing rules, etc. The metadata model definition can also include definitions of semantic keys. Semantic keys can be used by applications and/or users of applications to refer to entities in the data model. The computing system uses its own keys, called technical keys, to refer to entities in the data model. As such, when the computing system receives the metadata model definition, the computing system determines technical keys for the entities and determines mappings between the semantic keys and the technical keys. The computing system then stores the metadata model definition so the computing system can manage data (e.g., create data, modify data, delete data, access data, etc.) using the data model defined by the metadata model definition.

In some embodiments, the computing system includes mechanisms for providing versioning of the metadata model definition as well as the data that is managed according to the metadata model definition. Data that the computing system receives that is to be managed based on the data model may be referred to as data payload. Data payload is separate and distinct from metadata (e.g., a metadata model definition) describing a data model. However, data payload can be logically coupled to the metadata describing the data model. In addition, both data payload and metadata describing the data model utilize the same lifecycle handling and storage design in some embodiments.

Figure 1:
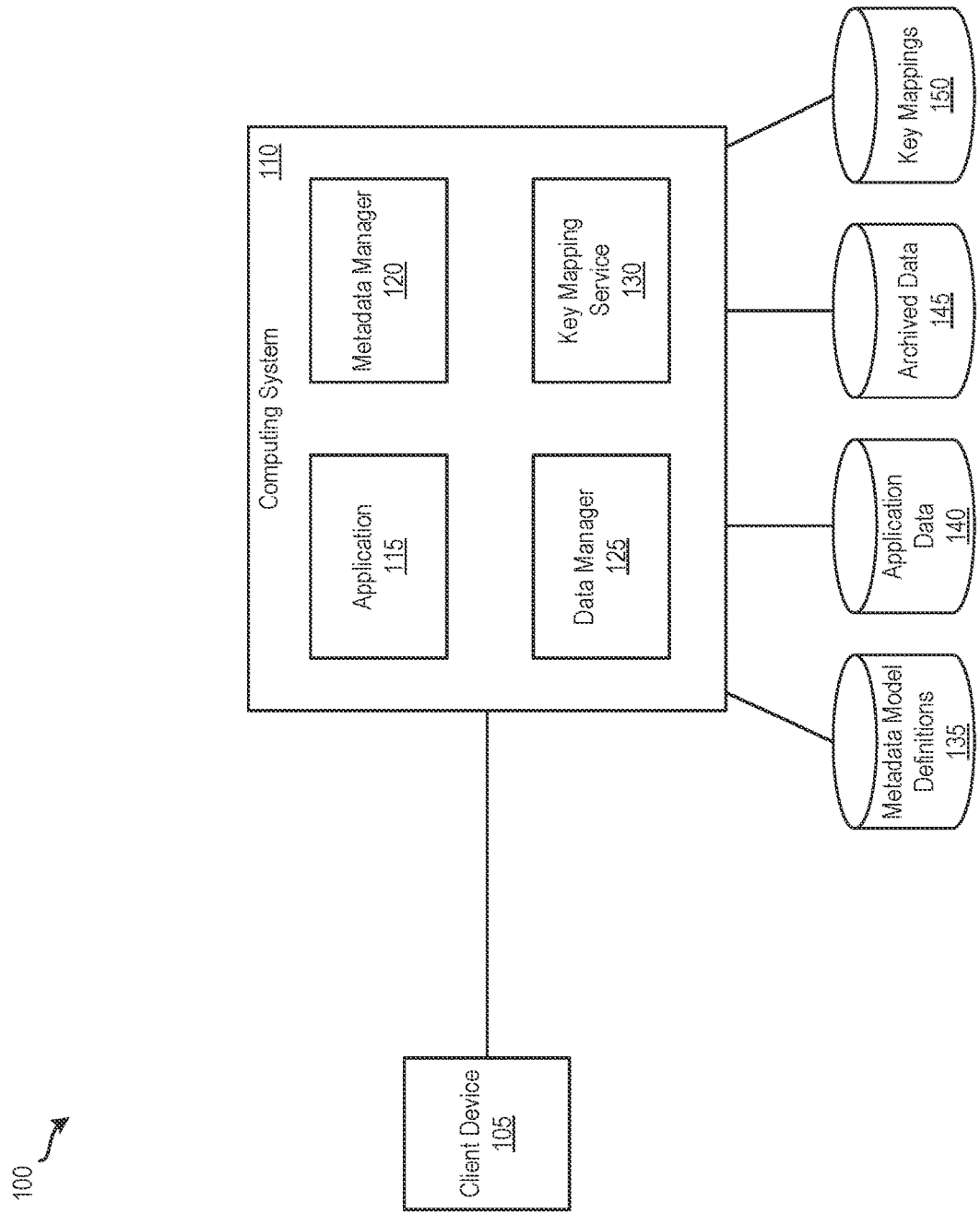
FIG. 1 illustrates a system for implementing data persistency models according to some embodiments.

FIG. 1 illustrates a system 100 for implementing data persistency models according to some embodiments. As shown, system 100 includes client device 105, computing system 110, and storages 135-150. Metadata model definitions storage 135 is configured to store metadata model definitions. In some embodiments, a metadata model definition includes metadata for describing a data model. Application data storage 140 stores application data that is managed and organized according to a data model defined by a metadata model definition. Archived data storage 145 is configured to store archived application data. Key mappings storage 150 stores mappings between keys (e.g., mappings between semantic keys and technical keys). In some embodiments, storages 135-150 are implemented in a single physical storage while, in other embodiments, storages 135-150 may be implemented across several physical storages. While FIG. 1 shows storages 135-150 as external to computing system 110, one of ordinary skill in the art will appreciate that metadata model definitions storage 135, application data storage 140, archived data storage 145, and/or key mappings storage 150 may be part of computing system 110 in some embodiments.

Client device 105 is configured to communicate and interact with computing system 110. For instance, a user of client device 105 can send application 115 a metadata model definition describing a data model. The user of client device 105 may also send application 115 requests to change a metadata model definition, such as modifications to entities, entity fields, entity relationships, etc. Also, the user of client device 105 can send application 115 data to be managed according to a data model. For data that computing system 110 is managing according to a data model, the user of client device 105 may send application 115 various requests associated with the data, such as, for example, requests to change data, requests to change the status of data, requests to access data, etc. While FIG. 1 shows one client device interacting with computing system 110, one of ordinary skill in the art will understand that additional client devices similarly configured to client device 105 may interact with computing system 110 in a similar fashion as client device 105.

As illustrated in FIG. 1, computing system 110 includes application 115, metadata manager 120, data manager 125, and key mapping service 130. Application 115 is a software application operating on computing system 110 that is configured to provide data management functions to client device 105. For instance, application 115 may receive from client device 105 a metadata model definition describing a data model. In response to receiving the metadata model definition, application 115 sends the metadata model definition to metadata manager 120 for processing. Application 115 can also receive from client device 105 data that is to be managed according to a data model defined by a metadata model definition. Upon receiving such data, application 115 sends it to data manager 125 for processing. When application 115 receives a request associated with data being managed according to a data model, application 115 sends the request to data manager 125.

Metadata manager 120 is responsible for managing data models. For example, metadata manager 120 manages metadata model definitions that describe data models. Metadata manager 120 can receive from application 115 a metadata model definition. In some embodiments, a metadata model definition includes definitions of entities, definitions of relationships between the entities, and definitions of semantic keys. As mentioned above, semantic keys can be used by applications and/or users of applications to refer to entities in a data model. In response to receiving the metadata model definition, metadata manager 120 determines technical keys that metadata manager 120 uses to refer to entities in the data model defined by the metadata model definition. Metadata manager 120 also determines mappings between the semantic keys and the technical keys. For example, when a semantic key and a technical key both refer to the same entity definition, metadata manager 120 determines a mapping between the semantic key and the technical key. After the mappings are determined, metadata manager 120 stores the metadata model definition in metadata model definitions storage 135. Metadata manager 120 can also handle requests for changes to data models. For instance, metadata manager 120 may receive from application 115 a request to change a data model. In response to the request, metadata manager 120 updates the metadata model definition stored in metadata model definitions storage 135 describing the data model.

Data manager 125 is configured to manage data according to a data model defined by a metadata model definition. For example, data manager 125 can receive from application 115 data that is to be managed by a data model. In response, data manager 125 retrieves from metadata model definitions storage 135 a metadata model definition defining the data model. Then, data manager 125 determines a semantic key associated with the data based on the metadata model definition and sends key mapping service 130 a request for a technical key to which the semantic key maps. In cases where no mapping exists, data manager 125 generates a new instance of an entity associated with the data and determines a technical key for the instance of the entity. Next, data manager 125 sends key mapping service 130 the semantic key, the technical key, and a request to store a mapping between the semantic key and the technical key. Finally, data manager 125 generates a record of the state of the instance of the entity, which includes the semantic key, the technical key, and the data, and stores it in metadata model definitions storage 135.

Key mapping service 130 serves to manage mappings between keys. For example, key mapping service 130 may receive from data manager 125 mappings between semantic keys and technical keys. In response to receiving the mappings, key mapping service 130 stores them in key mappings storage 150. In some instances, key mapping service 130 can receive from data manager 125 a semantic key and a request for a technical key that is mapped to the semantic key. In response to the request, key mapping service 130 accesses key mappings storage 150 to determine the technical key that corresponds to the semantic key and sends the technical key to data manager 125. If a mapping exists, key mapping service 130 sends the technical key to data manager. Otherwise, key mapping service 130 sends data manager 125 a message indicating so.

Figure 2:
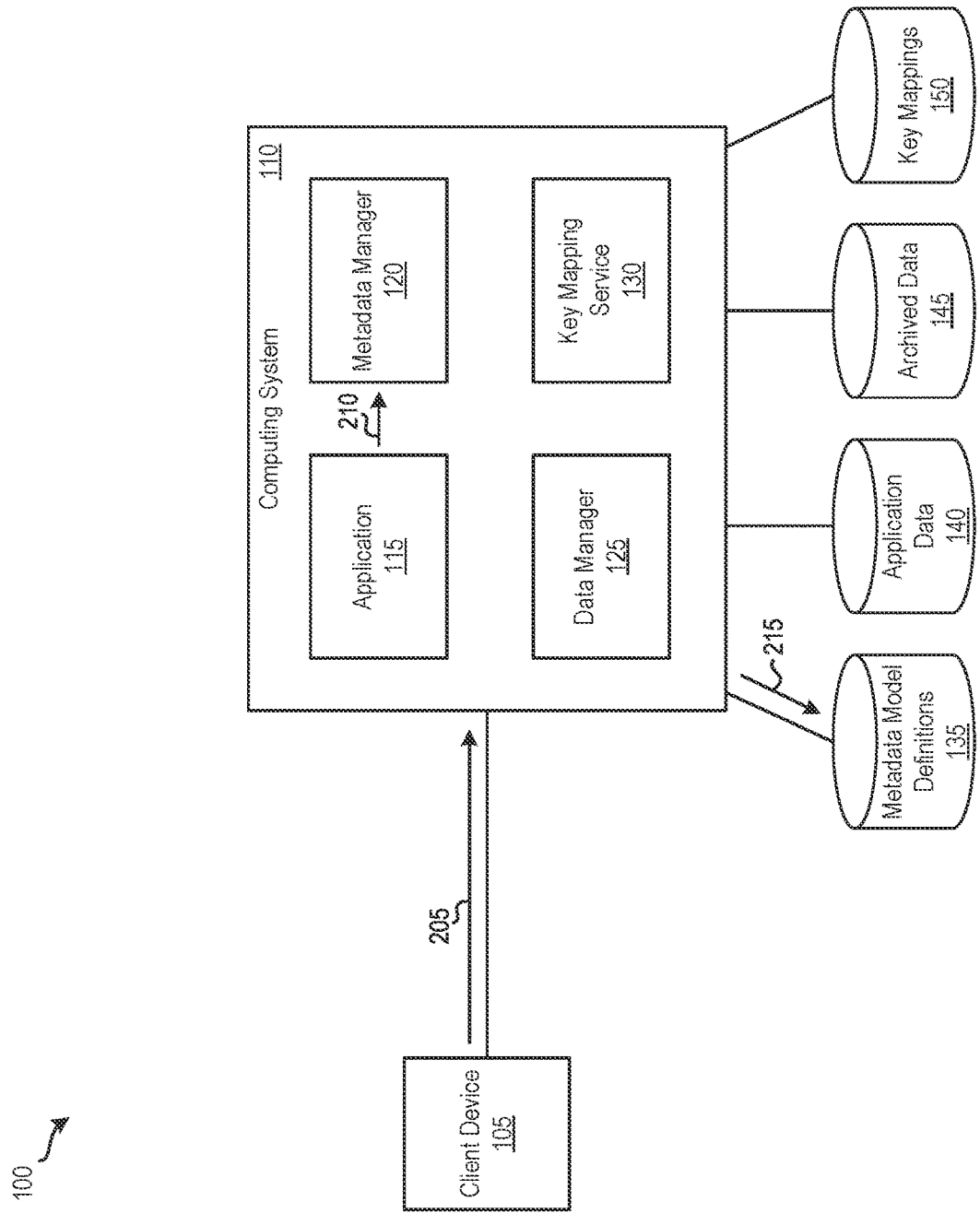
FIG. 2 illustrates an example operation of the system illustrated in FIG. 1 according to some embodiments.

FIG. 2 illustrates an example operation of system 100 according to some embodiments. In particular, the example operation shows how computing system 110 processes a new metadata model definition. The example will be described by reference to FIGS. 3-5. The example operation starts by a user of client device 105 sending, at 205, a metadata model definition to application 115. As explained above, in some embodiments, a metadata model definition includes metadata for describing a data model. The metadata model definition can include definitions of entities (e.g., entity definitions), definitions of relationships between the entities (e.g., relationship definitions), and definitions of semantic keys (e.g., semantic key definitions).

FIG. 3 illustrates example entity definitions 300 according to some embodiments. Specifically, entity definitions 300 are some of the entity definitions included the metadata model definition that the user of client device 105 sends to application 115 in this example. As shown, entity definitions 300 includes definitions for two entities: a SalesOrderHeader entity and a CostCenter entity. The SalesOrderHeader entity includes a SalesOrder field, a SoldToParty field, a ControllingArea field, a CostCenter field, and a SalesOrderDate field. The datatype defined for the SalesOrder field is a string datatype with a maximum length of 10 characters. The datatype defined for the SoldToParty field, ControllingArea field, and CostCenter field is an EntityIdentity datatype. For this example, the EntityIdentity datatype represents a reference to a corresponding entity in the metadata model definition. The datatype defined for the SalesOrderDate field is a date datatype with a maximum length of 8 characters. The CostCenter entity includes a CostCenter field, a ControllingArea field, and a ValidityEndDate field. The datatype defined for the CostCenter field is a string datatype with a maximum length of 10 characters. The datatype defined for the ControllingArea field is an EntityIdentity datatype, which, as mentioned above, is a reference to a corresponding entity in the metadata model definition. The datatype defined for the ValidityEndDate is a date datatype with a maximum length of 8 characters.

FIG. 4 illustrates example semantic key definitions 400 according to some embodiments. In particular, semantic key definitions 400 are some of the semantic key definitions included in the metadata model definition in this example. As illustrated, semantic key definitions 400 includes semantic key definitions for two entities: the SalesOrderHeader entity and the CostCenter entity. The semantic key definition for the SalesOrderHeader entity specifies a semantic identity key. In some embodiments, a semantic identity key is a field in an entity that is used to refer to an instance of the entity. As such, the SalesOrder field in a SalesOrderHeader entity is used to refer to instances of the SalesOrderHeader entity. The semantic key definitions for the CostCenter entity specifies two semantic identity keys and two semantic validity keys. Any combination of a semantic identity key and a semantic validity key may be used to refer to an instance of a CostCenter entity. The first semantic identity key (PrimaryIdentityKey) specifies the ControllingArea field and the CostCenter field of a CostCenter entity to be used to refer to instances of the CostCenter entity. The second semantic identity key specifies the CostCenterUniqueID field (not shown in FIG. 3) of a CostCenter entity to be used to refer to instances of the CostCenter entity. In some embodiments, a semantic validity key specifies a set of criteria for referring to a particular state of an entity. For example, the first semantic validity key specifies the ValidityEndDate field of a CostCenter entity to be used to identify different states of an instance of the CostCenter entity. Similarly, the second semantic validity key specifies the ValidityStartDate field (not shown in FIG. 3) of a CostCenter entity to be used to identify different states of an instance of the CostCenter entity.

Returning to FIG. 2, upon receiving the metadata model definition from client device 105, application 115 sends, at 210, it to metadata manager 120. When metadata manager 120 receives the metadata model definition, metadata manager 120 determines technical keys for referring to entities defined in the metadata model definition. In some embodiments, a technical key includes an identity identifier (ID), a validity ID, and a transaction ID. An identity ID may be a unique value for identifying an entity. Metadata manager 120 may determine an identity ID for a technical key for a particular entity defined in the metadata model definition by randomly generating a unique value and using the generated value as the identity ID of the technical key for the particular entity. In some embodiments, a validity ID specifies a set of criteria for referring to a particular state of an entity. Thus, a validity ID is unique within the context of a particular identity ID. Examples of criteria include an end date, a start date, an engineering change number, a version number (e.g., for software applications), etc. The transaction ID can be a globally unique value that represents a recorded transaction in computing system 110. Metadata manager 120 can determine transaction IDs using a sequential numbering technique. For example, metadata manager 120 may determine the transaction ID for the first technical key it determines to be the value 1. Metadata manager 120 can then use the value 2 as the transaction ID for the second technical key it determines, the value 3 as the transaction ID for the third technical key it determines, and so on and so forth. Once metadata manager 120 determines the technical keys for entities in the data model, metadata manager 120 stores the technical keys with the metadata model definition in a set of records.

FIG. 5 illustrates example records 500 of entity definitions 300 according to some embodiments. Specifically, FIG. 5 shows how entity definitions 300 are stored as records. As shown, records 500 include two records 505 and 510. Record 505 stores the entity definition for the SalesOrderHeader entity in entity definitions 300. Here, metadata manager 120 determines a technical key for the SalesOrderHeader entity that includes an identity ID, a validity ID, and a transaction ID. In this example, metadata manager 120 randomly generates a unique number (e.g., a number that has not been assigned to an identity ID) as the value (23 in this example) for the identity ID. The validity ID (53) in this example is a value that refers to a validity entity defining a set of criteria to use for referring to a particular state of the SalesOrderHeader entity. Metadata manager 120 determined the value for the transaction ID to be 99 because, in this example, the value of the most recent transaction ID is 98. In addition, metadata manager 120 determines a technical key for the CostCenter entity that includes an identity ID, a validity ID, and a transaction ID. Similarly, metadata manager 120 randomly generates a unique number as the value (60 in this example) for the identity ID. The validity ID (32) for the second technical key in this example is a value that refers to a validity entity defining a set of criteria to use for referring to a particular state of the CostCenter entity. Metadata manager 120 determined the value for the transaction ID to be 103 as the value of the most recent transaction ID is 102 (i.e., computing system 110 recorded three other transactions between recording record 505 and recording record 510). Records 505 and 510 each include a Lifecycle Status Code field that stores a value representing a status of the record. In this example, a Lifecycle Status Code value of 1 indicates that the record has an active status.

Figure 6:
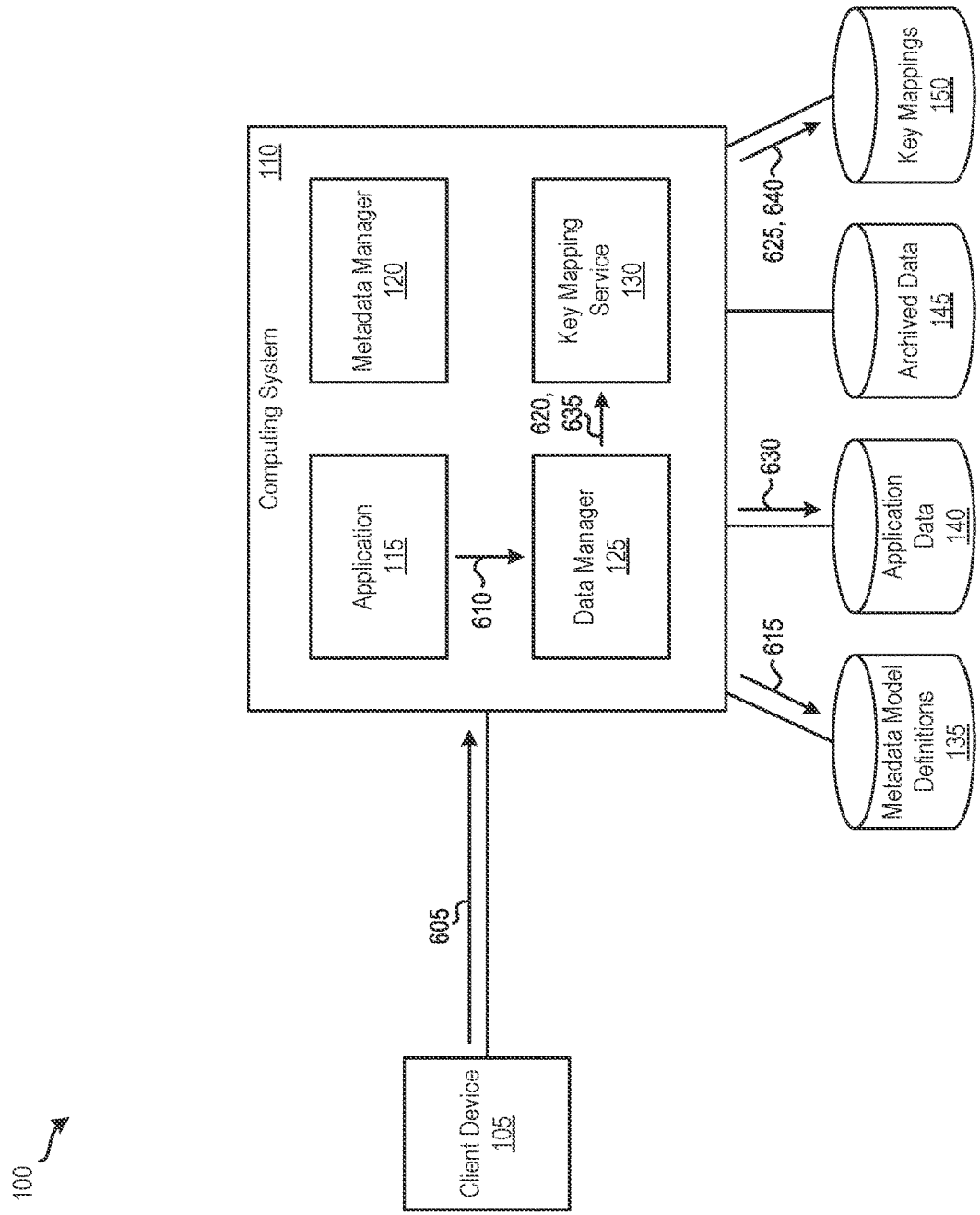
FIG. 6 illustrates another example operation of the system illustrated in FIG. 1 according to some embodiments.

FIG. 6 illustrates another example operation of system 100 according to some embodiments. In particular, this example operation depicts how computing system 110 processes data payload for a data model defined by a metadata model definition. The example will be described by reference to FIGS. 7-9. FIG. 7 illustrates example records 700 of entity definitions according to some embodiments. In particular, records 700 store entity definitions included in a metadata model definition that describes a data model being used for this example operation. As shown, records 700 includes three records 705-715. Record 705 is similar to record 505 in that they are both records that store the entity definition for a SalesOrderHeader entity except record 705 includes some additional fields, such as a TotalNetAmount field and a TransactionCurrency field. In addition, the technical key associated with record 705 is different (i.e., the identity ID and validity ID remain the same but the Transaction ID is different). Record 510 stores the entity definition for a Customer entity and the technical key associated with the Customer entity. Similarly, record 515 stores the entity definition for a Currency entity and the technical key associated with the Currency entity. In addition, semantic key definitions 400 depicted in FIGS. 4 and 8 will be used in this example.

FIG. 8 illustrates additional example semantic key definitions 800 according to some embodiments. In particular, semantic key definitions 800 are some of the semantic key definitions included in the metadata model definition used for this example. As shown, semantic key definitions 800 includes semantic key definitions for two entities: the Customer entity and the Currency entity. The semantic key definition for the Customer entity specifies a semantic identity key that uses the Customer field in the Customer entity to refer to instances of the Customer entity. The semantic key definition for the Currency entity specifies a semantic identity key that uses the Currency field in the Currency entity to refer to instances of the Currency entity.

Returning to FIG. 6, the example operation begins by a user of client device 105 sending, at 605, a value of 4711 for the SalesOrder field of the SalesOrderHeader entity. In this example, the user enters this value for the SalesOrder field in a form included in a graphical user interface (GUI) provided to client device 105 by application 115 and submits the form to application 115. Upon receiving the data payload (the value for the SalesOrder field of the SalesOrderHeader entity in this example), application 115 sends, at 610, it to data manager 125. When data manager 125 receives the data payload from application 115, data manager 125 accesses, at 615, metadata model definitions storage 135 to retrieve the entity definition for the SalesOrderHeader entity (i.e., record 705). Next, data manager 125 determines the semantic key associated with the SalesOrderHeader entity, which is the SalesOrder field in this example. Then, data manager 125 send, at 620, key mapping service 130 a request for a technical key to which the semantic maps. In response to the request, key mapping service 130 accesses, at 625, key mappings storage 150 to look for it. For this example, no mapping exists that specifies a value of 4711 for the SalesOrder field. As such, data manager 125 determines that it needs to create a new instance of the SalesOrderHeader entity. Using the structure of the SalesOrderHeader entity defined in record 705, data manager 125 generates an instance of the SalesOrderHeader entity and populates it with the data payload (i.e., populates the SalesOrder field with the value of 4711). Data manager 120 next determines a technical key (e.g., an identity ID, a validity ID, and a transaction ID) for the instance of the SalesOrderHeader entity. Data manager 120 then accesses, at 630, application data storage 140 and stores the technical key and the instance of the SalesOrderHeader entity in a record in a table that is configured to store records of instances of the SalesOrderHeader entity.

FIGS. 9A-9J illustrate example records of an instance of an entity according to some embodiments. Specifically, FIGS. 9A-9J illustrate example records of instances of the SalesOrderHeader entity defined by the entity definitions stored in records 700. FIG. 9A illustrates an example record 900 of an instance of the SalesOrderHeader entity defined by the entity definition stored in record 705. Specifically, record 900 is the record of the state of the instance of the SalesOrderHeader entity that data manager 125 stores in the table mentioned above. As previously explained, the data payload that application 115 receives from client device 105 includes a value for the SalesOrder field of a new instance of the SalesOrderHeader entity. As shown, record 900 includes a Data field, which is used to store the data payload. In this example, the value of the SalesOrder field of the instance of the SalesOrderHeader entity is 4711. The remaining fields in the instance of the SalesOrderHeader have null values. As shown in FIG. 9A, data manager 125 determined a value of 6721, which is a randomly generated unique number, for the identity ID of the technical key and a value of 923, which is a value determined using a sequential numbering technique, for the transaction ID of the technical key. Data manager 125 determines the value of the validity ID as null. Then, data manager 125 sends, at 635, the mapping between the determined semantic key and identity ID of the technical key associated with the instance of the SalesOrderHeader to key mapping service 130. Upon receiving the mapping, key mapping service 130 stores, at 640, the mapping in key mappings storage 150. In some embodiments, when data manager 125 creates a record of an instance of an entity, data manager 125 sets the status of the record to a default "in process" status. For this example, a value of 0 represents an "in process" status. The Lifecycle Status Code field in record 900, which stores a value representing the status of the record, is set to 0.

After the user of client device 105 provides application 115 a value for the SalesOrder field of the SalesOrderHeader entity, the user sends application 115 another data payload. This time, the user adds a value of "EER" for the TransactionCurrency field of the SalesOrderHeader entity using the same form provided to client device 105 by application 115 and submits the form to application 115. When application 115 receives the data payload (the value 4711 for the SalesOrder field and the value "EER" for the TransactionCurrency field), application 115 sends it to data manager 125. Upon receiving the data payload, data manager 125 accesses metadata model definitions storage 135 and retrieves record 705, which is the entity definition for the SalesOrderHeader entity in this example. Based on record 705, data manager 125 determines that the SalesOrder field of the SalesOrderHeader entity is the semantic key associated with the entity. Thus, data manager 125 sends key mapping service 130 a request for the identity ID of the technical key that corresponds to the SalesOrder field value of 4711. When key mapping service 130 receives the request, key mapping service 130 accesses key mappings storage 150 to retrieve the mapping. Here, a mapping exists and it indicates that the value of 4711 for the SalesOrder field maps to an identity ID value of 6721. Accordingly, key mapping service 130 sends the identity ID value of 6721 to data manager 125. In response, data manager 125 accesses application data storage 140 and retrieves from the table configured to store records of instances of the SalesOrderHeader entity the most recent record with an identity ID equal to the technical key (i.e., 6721). In this example, record 900 is the most recent record. Data manager 125 adds the value "EER" to the TransactionCurrency field and determines a technical key (e.g., an identity ID, a validity ID, and a transaction ID) for the new state of the instance of the SalesOrderHeader entity. Then, data manager 125 stores the modified instance of the SalesOrderHeader entity as another record in the SalesOrderHeader entity table.

FIG. 9B illustrates an example record 905 of an instance of the SalesOrderHeader entity defined by the entity definition stored in record 705. In particular, record 905 is the record of the state of the instance of the SalesOrderHeader entity that data manager 125 stores after receiving the data payload that includes 4711 as the value for the SalesOrder field and "EER" as the value of the TransactionCurrency field. As depicted in FIG. 9B, the data payload is stored in the Data field of record 905. The data payload is similar to the data payload in record 900 except record 905 includes a value of the TransactionCurrency field. As shown, since record 905 is storing the state of the same instance of the SalesOrderHeader entity as record 900, the identity IDs of records 900 and 905 have the same value of 6721. Because data manager 125 records record 905 right after record 900, the transaction ID has a value of 924. As mentioned above, data manager 125 can set the status of the record to a default "in process" status when creating a record of an instance of an entity. As such, the Lifecycle Status Code field in record 905 is set to 0.

Next, the user of client device 105 uses the same form provided to client device 105 by application 115 to change the value for the TransactionCurrency field of the SalesOrderHeader entity from "EER" to "EUR" and then submits the form to application 115. Upon receiving the data payload (the value 4711 for the SalesOrder field and the value "EUR" for the TransactionCurrency field), application 115 sends it to data manager 125. In response, data manager 125 accesses metadata model definitions storage 135 and retrieves record 705, which defines the SalesOrderHeader entity. Using the definition specified in record 705, data manager 125 determines that the SalesOrder field of the SalesOrderHeader entity is the semantic key associated with the entity. Then, data manager 125 sends key mapping service 130 a request for the identity ID of the technical key that corresponds to the SalesOrder field value of 4711. After receiving the request, key mapping service 130 accesses key mappings storage 150 to retrieve a mapping indicating that the value of 4711 for the SalesOrder field maps to an identity ID value of 6721. Key mapping service 130 then sends the identity ID value of 6721 to data manager 125. Data manager 125 accesses application data storage 140 and retrieves from the SalesOrderHeader entity table the most recent record with an identity ID equal to the technical key (i.e., 6721). For this example, record 910 is the most recent record. Then, data manager 125 replaces the value "EER" in the TransactionCurrency field with the value "EUR" and determines a technical key (e.g., an identity ID, a validity ID, and a transaction ID) for the new state of the instance of the SalesOrderHeader entity. Data manager 125 then stores the modified instance of the SalesOrderHeader entity as another record in the SalesOrderHeader entity table.

FIG. 9C illustrates an example record 910 of an instance of the SalesOrderHeader entity defined by the entity definition stored in record 705. Specifically, record 910 is the record of the state of the instance of the SalesOrderHeader entity that data manager 125 stores after receiving the data payload that includes 4711 as the value for the SalesOrder field and "EUR" as the value of the TransactionCurrency field. As shown, the data payload is stored in the Data field of record 910. The data payload is similar to the data payload in record 905 except record 910 includes a different value in the TransactionCurrency field. As record 910 is storing the state of the same instance of the SalesOrderHeader entity as records 900 and 905, the values for the identity ID are the same. The transaction ID of record 910 has a value of 1027 since, in this example, data manager 125 records several other transactions between the recording of record 905 and record 910. The Lifecycle Status Code field in record 910 is set to 0, indicating an "in process" status.

Now, the user of client device 105 (or another user of another client device) sends application 115 a request to change the status associated with the instance of the SalesOrderHeader entity to an "active" status (i.e., a request to activate the instance of the SalesOrderHeader entity). The request also specifies a value of 4711 for the SalesOrder field. When application 115 receives the request, application 115 forwards it to data manager 125. In response to receiving the request, data manager 125 sends mapping service 130 a request for a technical key that is mapped to 4711 for the SalesOrder field. In response to the request, key mapping service 130 accesses key mappings storage 150 to determine the technical key that corresponds to this semantic key and sends the technical key (an identity ID of 6721 in this example) to data manager 125. Next, data manager 125 accesses application data storage 140 and retrieves from the table configured to store records of instances of the SalesOrderHeader entity the most recent record with an identity ID equal to the technical key (i.e., 6721). For this example, record 910 is the most recent record. Data manager 125 then converts any references to other entities specified in the record. Here, the only entity referenced in record 910 is a reference to a Currency entity. In some embodiments, data manager 125 converts such a reference by querying a table configured to store records of instances of the entity that is being referenced and retrieving the identity ID of a matching record in the table. In this example, data manager 125 converts the reference to the Currency entity by querying a table configured to store records of instances of the Currency entity and retrieving the identity ID of the record that has a value "EUR" in the Currency field. Then, data manager 125 replaces the value in the TransactionCurrency field with the value of the identity ID. Next, data manager 125 stores the converted record as another record in the SalesOrderHeader entity table.

FIG. 9D illustrates an example record 915 of an instance of the SalesOrderHeader entity defined by the entity definition stored in record 705. In particular, record 915 is the record of the state of the instance of the SalesOrderHeader entity that data manager 125 stores after converting the TransactionCurrency field in the manner described above. As depicted in FIG. 9D, the data payload is similar to the data payload in record 910 except the value in the TransactionCurrency field has been converted from "EUR" to the identity ID corresponding the instance of the Currency entity associated with "EUR" (9823 in this example). Since record 915 is storing the state of the same instance of the SalesOrderHeader entity as records 900-910, the values for the identity ID in records 900-915 are the same. The transaction ID of record 915 has a value of 1064 as, in this example, data manager 125 records other transactions between the recording of record 910 and record 915. The Lifecycle Status Code field in record 915 is set to 1, which represents an "active" status in this example.

The user of client device 105 then adds a value of "ACME" for the SoldToParty field of the SalesOrderHeader entity through the same form provided to client device 105 by application 115. The user of client device 105 sends the data payload (the value 4711 for the SalesOrder field and the value "ACME" for the SoldToParty field) to application 115, which forwards it to data manager 125. Once data manager 125 receives the data payload, data manager 125 accesses metadata model definitions storage 135 and retrieves record 705, which is the entity definition for the SalesOrderHeader entity in this example. Using record 705, data manager 125 determines that the SalesOrder field of the SalesOrderHeader entity is the semantic key associated with the entity. As such, data manager 125 sends key mapping service 130 a request for the identity ID of the technical key that corresponds to the SalesOrder field value of 4711. Key mapping service 130 accesses key mappings storage 150 to retrieve the mapping. Such a mapping exists, which indicates that the value of 4711 for the SalesOrder field maps to an identity ID value of 6721. Key mapping service 130 responds to the request by sending data manager 125 the retrieved identity ID.

Next, data manager 125 accesses application data storage 140 and retrieves from the SalesOrderHeader entity table the most recent record with an identity ID equal to the technical key (i.e., 6721). In this example, record 915 is the most recent record. Data manager 125 then adds the value "ACME" to the SoldToParty field" and determines a technical key (e.g., an identity ID, a validity ID, and a transaction ID) for the new state of the instance of the SalesOrderHeader entity. Data manager 125 stores the modified instance of the SalesOrderHeader entity as another record in the SalesOrderHeader entity table.

FIG. 9E illustrates an example record 920 of an instance of the SalesOrderHeader entity defined by the entity definition stored in record 705. Specifically, record 920 is the record of the state of the instance of the SalesOrderHeader entity that data manager 125 stores after adding a value "ACME" to the SoldToParty field. As illustrated, the data payload in record 920 is similar to the data payload in record 915 except a value ("ACME") has been added to the SoldToParty field. Record 920 is storing the state of the same instance of the SalesOrderHeader entity as records 900-915. Thus, the values for the identity ID in records 900-920 are the same. For this example, data manager 125 records one transaction between the recording of record 915 and record 920. Hence, the transaction ID for record 920 is 1066. As explained above, in some embodiments, when data manager 125 creates a record of an instance of an entity, data manager 125 sets the status of the record to a default "in process" status. Here, the Lifecycle Status Code field in record 920 is set to 0, indicating an "in process" status.

The user of client device 105 (or another user of another client device) sends application 115 another request to change the status associated with the instance of the SalesOrderHeader entity to an "active" status. The request also specifies a value of 4711 for the SalesOrder field. In response to the request, application 115 forwards it to data manager 125, which, in turn, sends mapping service 130 a request for a technical key that is mapped to 4711 for the SalesOrder field. Once key mapping service 130 receives the request, key mapping service 130 accesses key mappings storage 150 to determine the technical key that corresponds to this semantic key and sends the technical key (an identity ID of 6721 in this example) to data manager 125. Data manager 125 accesses application data storage 140 and retrieves from the SalesOrderHeader entity table the most recent record with an identity ID equal to the technical key (i.e., 6721). For this example, record 920 is the most recent record. Next, data manager 125 converts any references to other entities specified in the record. In this example, the only entity referenced in record 920 that has not been converted is a reference to a Customer entity. As mentioned above, data manager 125 can convert a reference by querying a table configured to store records of instances of the entity that is being referenced and retrieving the identity ID of a matching record in the table. Here, data manager 125 converts the reference to the Customer entity by querying a table configured to store records of instances of the Customer entity and retrieving the identity ID of the record that has a value "ACME" in the Customer field. Data manager 125 then replaces the value in the SoldToParty field with the value of the identity ID. Next, data manager 125 stores the converted record as another record in the SalesOrderHeader entity table.

FIG. 9F illustrates an example record 925 of an instance of the SalesOrderHeader entity defined by the entity definition stored in record 705. In particular, record 925 is the record of the state of the instance of the SalesOrderHeader entity that data manager 125 stores after converting the SoldToParty field in the fashion explained above. As shown in FIG. 9F, the data payload is similar to the data payload in record 920 except the value in the SoldToParty field has been converted from "ACME" to the identity ID corresponding the instance of the Customer entity associated with "ACME" (3488 in this example). As record 925 is storing the state of the same instance of the SalesOrderHeader entity as records 900-920, the values for the identity ID in records 900-925 are the same. Record 925 is the record that data manager 125 records after record 920. Hence, the transaction ID of record 925 is 1067. The Lifecycle Status Code field in record 925 is set to 1, indicating an "active" status.

There are now two active records in the SalesOrderHeader entity table (records 915 and 925). So after recording record 925, data manager 125 modifies the status of record 915 because record 915 is not the most recent active record anymore. FIG. 9G illustrates an example record 915 of an instance of the SalesOrderHeader entity defined by the entity definition stored in record 705. As shown, data manager 125 has changed the value of the Lifecycle Status Code field in record 915 from 1 to 2, which represents an "outdate" status for this example.

After adding a value for the SoldToParty field, the user of client device 105 uses the same form provided to client device 105 by application 115 to change the value for the TransactionCurrency field of the SalesOrderHeader entity from "EUR" to "USD" and submits the form to application 115. When application 115 receives the data payload (the value 4711 for the SalesOrder field and the value "USD" for the TransactionCurrency field), application 115 sends it to data manager 125. Upon receiving the data payload, data manager 125 accesses metadata model definitions storage 135 and retrieves record 705, which defines the SalesOrderHeader entity. Based on the definition specified in record 705, data manager 125 determines that the SalesOrder field of the SalesOrderHeader entity is the semantic key associated with the entity. Next, data manager 125 sends key mapping service 130 a request for the identity ID of the technical key that corresponds to the SalesOrder field value of 4711. In response to the request, key mapping service 130 accesses key mappings storage 150 to retrieve a mapping indicating that the value of 4711 for the SalesOrder field maps to an identity ID value of 6721. Key mapping service 130 sends the identity ID value of 6721 to data manager 125. Then, data manager 125 accesses application data storage 140 and retrieves from the SalesOrderHeader entity table the most recent record with an identity ID equal to the technical key (i.e., 6721). For this example, record 925 is the most recent record. Data manager 125 replaces the value "'IdentityID': '9823'" (which corresponds to the value "EUR") in the TransactionCurrency field with the value "USD" and determines a technical key (e.g., an identity ID, a validity ID, and a transaction ID) for the new state of the instance of the SalesOrderHeader entity. Data manager 125 stores the modified instance of the SalesOrderHeader entity as another record in the SalesOrderHeader entity table.

FIG. 9H illustrates an example record 930 of an instance of the SalesOrderHeader entity defined by the entity definition stored in record 705. In particular, record 930 is the record of the state of the instance of the SalesOrderHeader entity that data manager 125 stores after receiving the data payload that includes 4711 as the value for the SalesOrder field and "USD" as the value of the TransactionCurrency field. As depicted in FIG. 9H, the data payload is stored in the Data field of record 930. The data payload is similar to the data payload in record 925 except record 930 includes a different value in the TransactionCurrency field. Since record 930 is storing the state of the same instance of the SalesOrderHeader entity as records 900-925, the values for the identity ID are the same. The transaction ID of record 930 has a value of 1067 because data manager 125 records several other transactions between the recording of record 925 and record 930 in this example. The Lifecycle Status Code field in record 910 is set to 0 to represent an "in process" status.

The user of client device 105 (or another user of another client device) now sends application 115 a request to change the status associated with the instance of the SalesOrderHeader entity to an "active" status. The request also specifies a value of 4711 for the SalesOrder field. In response to the request, application 115 forwards it to data manager 125. Once data manager 125 receives the request, data manager 125 sends mapping service 130 a request for a technical key that is mapped to 4711 for the SalesOrder field. In response, key mapping service 130 accesses key mappings storage 150 to determine the technical key that corresponds to this semantic key and sends the technical key (an identity ID of 6721 in this example) to data manager 125. Data manager 125 then accesses application data storage 140 and retrieves from the SalesOrderHeader entity table the most recent record with an identity ID equal to the technical key (i.e., 6721). Here, record 930 is the most recent record. Next, data manager 125 converts any references to other entities specified in the record. For this example, the only entity not referenced by a technical key in record 930 is a reference to a Currency entity. As described above, data manager 125 may, in some embodiments, convert a reference to an entity by querying a table configured to store records of instances of the entity that is being referenced and retrieving the identity ID of a matching record in the table. In this example, data manager 125 converts the reference to the Currency entity by querying a table configured to store records of instances of the Currency entity and retrieving the identity ID of the record that has a value "USD" in the Currency field. Next, data manager 125 replaces the value in the TransactionCurrency field with the value of the identity ID. Data manager 125 then stores the converted record as another record in the SalesOrderHeader entity table.

FIG. 9I illustrates an example record 935 of an instance of the SalesOrderHeader entity defined by the entity definition stored in record 705. In particular, record 935 is the record of the state of the instance of the SalesOrderHeader entity that data manager 125 stores after converting the TransactionCurrency field in the manner explained above. As illustrated in FIG. 9I, the data payload is similar to the data payload in record 930 except the value in the TransactionCurrency field has been converted from "USD" to the identity ID corresponding the instance of the Currency entity associated with "USD" (467 in this example). As record 935 is storing the state of the same instance of the SalesOrderHeader entity as records 900-930, the values for the identity ID in records 900-935 are the same. The transaction ID of record 935 has a value of 1069 because record 935 is the next record that data manager 125 records after recording record 930. As shown, data manager 125 sets the value of the Lifecycle Status Code field to 1 in order to indicate an "active" status.

The SalesOrderHeader entity table, again, has two records (records 925 and 935) with an "active" status. Therefore, data manager 125 modifies the status of record 925 because record 925 is no longer the most recent active record with the creation of record 935. FIG. 9J illustrates an example record 925 of an instance of the SalesOrderHeader entity defined by the entity definition stored in record 705. As illustrated, data manager 125 has changed the value of the Lifecycle Status Code field in record 925 from 1 to 2 to indicate an "outdate" status for this example.

Figure 10A:
FIGS. 10A-10C illustrate optimizations applied to the records illustrated in FIGS. 9A-9J according to some embodiments.
Figure 10B:
Figure 10C:

In some embodiments, data manager 125 can optimize how records are stored in an entity table. Examples of such optimizations will now be described by reference to FIGS. 10A-10C. FIGS. 10A-10C illustrate optimizations applied to records 900-935 according to some embodiments. Data manager 125 may apply the optimizations to an entity table at defined intervals (e.g., once an hour, once a day, once a week, etc.). One optimization that data manager 125 can apply to records in an entity table involves deleting records that have an "in process" status and also precede an active record. FIG. 10A illustrates a table 1000 of records after such an optimization is applied to records 900-935 in the SalesOrderHeader entity table. As shown, table 1000 includes records 915, 925, and 935. Records 900-910, 920, and 930 all have an "in process" status and all precedes record 935 (e.g., they all have transaction ID values that are lower than the transaction ID value of record 935), which is the current active record.

Another optimization technique that data manager 125 may apply to records in an entity table is only preserving the differences between consecutive records. In some instances, data manager 125 will store all the values for the currently active record. Table 1000 in FIG. 10A also shows this optimization applied. Furthermore, instead of storing lengthy names, indexes may be used for assigning values. As illustrated, the data payload in record 915 of table 1000 stores the values for the SalesOrder and TransactionCurrency fields. This is indicated by an index that corresponds to the position of the fields in the SalesOrderHeader entity. Since the SalesOrder field is the first field in the SalesOrderHeader entity, the value for the field is preceded by a "1:". Similarly, the TransactionCurrency field is the seventh field in the SalesOrderHeader entity so the value for the field is preceded by "7:". In addition, the value 9823 is for the identity ID of a technical key. Therefore, the "7:" is followed by a "1" to indicate that the value corresponds to the first value in the technical key. Accordingly, an index of "7:2" would correspond to the validity ID in the technical key and the index of "7:3" would correspond to the transaction ID in the technical key. Record 925 added a value for the SoldToParty field of the SalesOrderHeader entity. Thus, the data payload in record 925 of table 1000 stores only that value since that is the difference between record 915 and record 925. Record 935 updated the value for the TransactionCurrency field. However, record 935 is the current active record. Thus, the data payload in record 935 of table 1000 stores all the values in the instance of the SalesOrderHeader entity. If record 935 was not the current active record, it would store only the last element (7:1 "467").

In some embodiments, data manager 125 may archive records (e.g., move records from a primary storage, such as application data storage 140, to a secondary storage, such as archived data storage 145) that are no longer active and are outdated in order to save storage space in application data storage 140. When data manager 125 archives a record, data manager 125 can store the record in archived data storage 145. Then, data manager 125 changes the status associated with the record to an "archived" status. Additionally, data manager 125 can delete the data payload in the record. Data manager 125 also reconciles the deleted data payload with the data payload of the subsequent record. FIG. 10B illustrates a table 1005 that results after archiving a record in table 1000 according to some embodiments. As shown, table 1005 includes records 915, 925, and 935. For this example, data manager 125 archived record 915. That is, data manager 125 changed the value of the Lifecycle Status Code field to 3, which represents an "archived" status in this example, and deleted the data payload of record 915. In addition, data manager 125 reconciled the data payloads of record 915 and record 925. Here, data manage 125 added the values in the data payload of record 915 to the values in the data payload of record 925.

In some instances, data manager 125 can delete an instance of an entity from an entity table in response to receiving a request to delete the entity from a user of client device 105. To do so, data manager 125 first reconciles the data payload of the current active record of the instance of the entity and the data payload of the previous record. Then, data manager 125 creates a new record to store the state of the instance of the entity and sets the status of the new record to a "deleted" status. FIG. 10C illustrates a table 1010 that results after deleting the instance of the SalesOrderHeader entity in table 1005 according to some embodiments. As illustrated, table 1010 includes records 915, 925, and 935. In this example, data manager 125 performs a delete operation on the instance of the SalesOrderHeader entity. Data manager 125 performs the delete operation by reconciles the data payload record 935, the current active record of the instance of the SalesOrderHeader entity, and record 925, the previous record. Data manager 125 deletes all the data from the data payload of 935 except for the difference between the data payloads of records 925 and 935. Here, the differences are the values of the TransactionCurrency field. Next, data manager 125 generates a new record 1015 that represents the deleted state of the instance of the SalesOrderHeader entity. Since record 1015 is a record of a state of the same instance of the SalesOrderHeader as records 915, 925, and 935, record 1015 has the same identity ID value as records 915, 925, and 935. As shown, record 1015 does not have anything stored in its data payload. Also, the value for the Lifecycle Status Code field in record 1015 is 4, which represents a "deleted" status in this example.

As mentioned above, a metadata model definition may include definitions of various processing rules. One type of processing rule are consistency rules. In some embodiments, a consistency rule specifies a set of conditions used for validating data payloads. For example, when data manager 125 receives a data payload for an instance of an entity, data manager 125 can apply consistency rules defined for the entity to the data payload. If the set of conditions specified in the consistency rules are satisfied, data manager 125 determines that the data payload is valid. Otherwise, data manager 125 determines that the data payload is invalid.

Figure 11A:
FIGS. 11A and 11B illustrate example consistency rules according to some embodiments.
Figure 11B:

FIGS. 11A and 11B illustrate example consistency rules according to some embodiments. In particular, FIG. 11A illustrates an example consistency rule 1100 defined in a SalesOrderHeader entity (e.g., the SalesOrderHeader entity definition shown in FIG. 3 or FIG. 7). As such, consistency rule 1100 is used for validating data payloads for instances of a SalesOrderHeader entity. Here, the set of rules in consistency rule 1100 specifies three rules: (1) the value of the ControllingArea field in the SalesOrderHeader entity must be equal to the value of the ControllingArea of the field in the CostCenter entity referenced by the SalesOrderHeader entity, (2) the value of the ControllingArea field in the SalesOrderHeader entity is an initial value, and (3) the value of the ControllingArea field in the SalesOrderHeader entity is a null value. Because the three rules are separated by "or", if any of them are satisfied by the data payload, the data payload is determined to be consistent and, thus, valid. FIG. 11B illustrates another example consistency rule 1105 defined in a CostCenter entity (e.g., the CostCenter entity definition shown in FIG. 3). Accordingly, consistency rule 1105 is used for validating data payloads for instances of a CostCenter entity. For this example, the set of rules in consistency rule 1105 specifies one rule: the value of the ValidityEndDate field must be greater than or equal to the value of the ValidityStartDate.

Figure 12:
FIG. 12 illustrates an example transformation rule according to some embodiments.

Another type of processing rule are transformation rules. In some embodiments, a transformation rule specifies a set of operations to perform on data in an instance of an entity. For example, when data manager 125 receives a data payload for an instance of an entity, data manager 125 can apply transformation rules defined for the entity to the data payload. FIG. 12 illustrates an example transformation rule 1200 according to some embodiments. For this example, transformation 1200 is specified in the TotalNetAmount field of a SalesOrderHeader entity definition (e.g., the SalesOrderHeader entity definition depicted in FIG. 7). As shown, transformation rule 1200 is used for defining a calculated field. Here, transformation rule 1200 is calculating the sum of the amounts of each SalesOrderItem entity referenced by the SalesOrderHeader entity (i.e., instances of the SalesOrderItem that belong to the same SalesOrderHeader instance).

Transformation rules can also be used for supporting changes to a data model. For instance, the metadata model definition defining the data model may be modified with a set of transformation rules to perform operations to implement the change to the data model. FIG. 13 illustrates an example change to a metadata model definition using a transformation rule according to some embodiments. Specifically, FIG. 13 illustrates a table 1300 of records storing entity definitions of a data model. As shown, table 1300 includes record 705 and 1305. As explained above, record 705 defines the datatype of the SalesOrder field as being a string datatype with a maximum length of 10 characters. In this example, the data model is being changed so that the maximum length of the SalesOrder field has a maximum length of 20 characters. In order to implement this change, the SalesOrder field of existing records of instances of the SalesOrderHeader entity are to be extended. Record 1305 includes a transformation rule that extends the values of the SalesOrder field to 20 characters by left padding with 0s until there are 20 characters. FIGS. 14A and 14B illustrate the transformation rule illustrated in FIG. 13 applied to example records according to some embodiments. In particular, FIG. 14A illustrates a table 1400 of records in a SalesOrderHeader entity table. As shown, table 1400 includes two records 1405 and 1410. The values of the SalesOrder field in records 1405 and 1410 are each 10 characters long. FIG. 14B illustrates table 1400 after the transformation rule illustrated in FIG. 13 is applied to table 1400 in FIG. 14A. Here, data manager 125 generates a new record 1415 by taking the value of the SalesOrder field in record 1405 and applying the transformation rule to it. Data manager 125 stores the resulting value in the SalesOrder field of record 1415. Data manager 125 generates another new record 1420 by taking the value of the SalesOrder field in record 1410 and applying the transformation rule to it. Data manager 125 stores this resulting value in the SalesOrder field of record 1420. As shown, the values of the SalesOrder field in records 1415 and 1420 are now 20 characters long.

Figure 15:
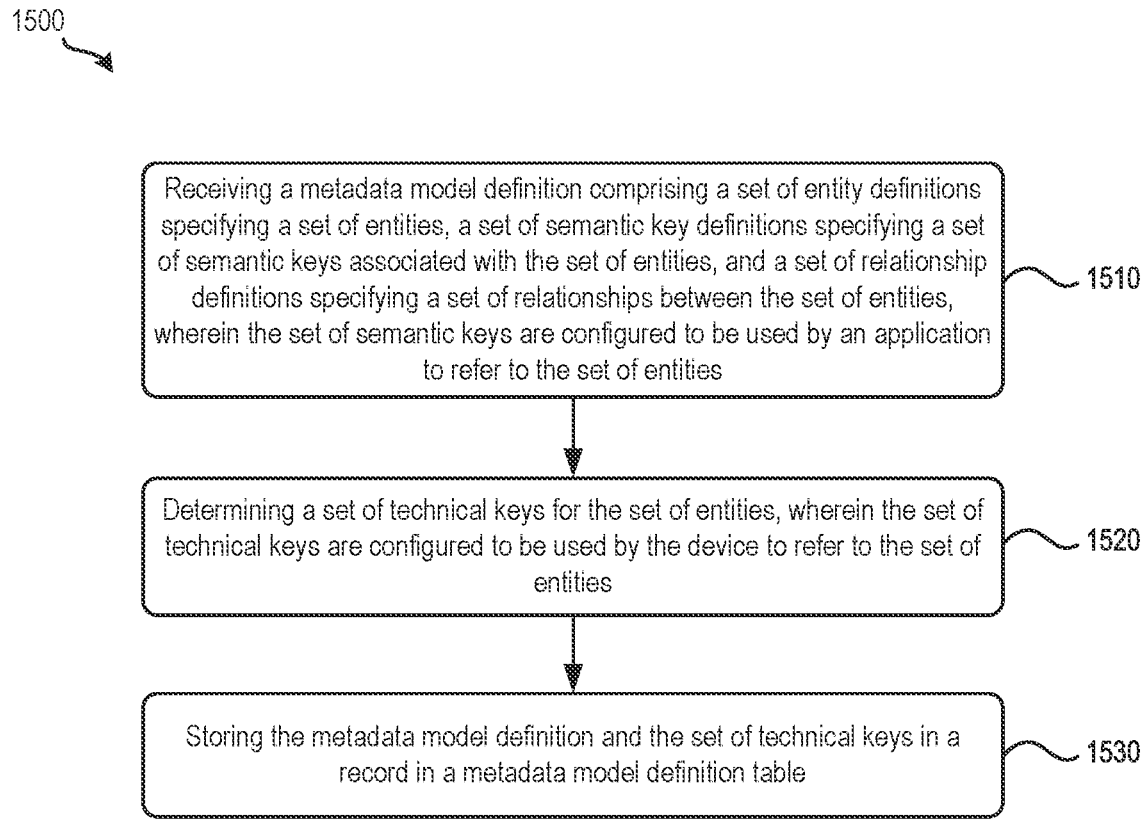
FIG. 15 illustrates a process for handling metadata model definitions according to some embodiments.

FIG. 15 illustrates a process 1500 for handling metadata model definitions according to some embodiments. In some embodiments, computing system 110 performs process 1500. Process 1500 starts by receiving, 1510, a metadata model definition comprising a set of entity definitions specifying a set of entities, a set of semantic key definitions specifying a set of semantic keys associated with the set of entities, and a set of relationship definitions specifying a set of relationships between the set of entities. The set of semantic keys are configured to be used by an application to refer to the set of entities. Referring to FIGS. 1, 3, and 4 as an example, application can receive from client device 105 a metadata model definition that includes entity definitions shown in FIG. 3 and semantic key definitions shown in FIG. 4. A reference to another entity defined in an entity definition can be a relationship definition. For example, a reference to a Customer entity, a ControllingArea entity, or a CostCenter entity specified in the SalesOrderHeader entity may be a relationship definition.

Next, process 1500 determines, at 1520, a set of technical keys for the set of entities. The set of technical keys are configured to be used by the device to refer to the set of entities. Referring to FIGS. 1 and 5 as an example, metadata manager 120 can determine a set of technical keys for the set of entities. In some embodiments, a technical key includes an identity ID, a validity ID, and a transaction ID. These IDs may be determined in a similar manner as the IDS determined for the technical keys in records 505 and 510.

Finally, process 1500 stores, at 1530, the metadata model definition and the set of technical keys in a set of records. Referring to FIGS. 1 and 5 as an example, metadata manager 120 may store metadata model definition that includes entity definitions shown in FIG. 3 and a set of technical keys in a set of records that includes record 505 and record 510.

Figure 16:
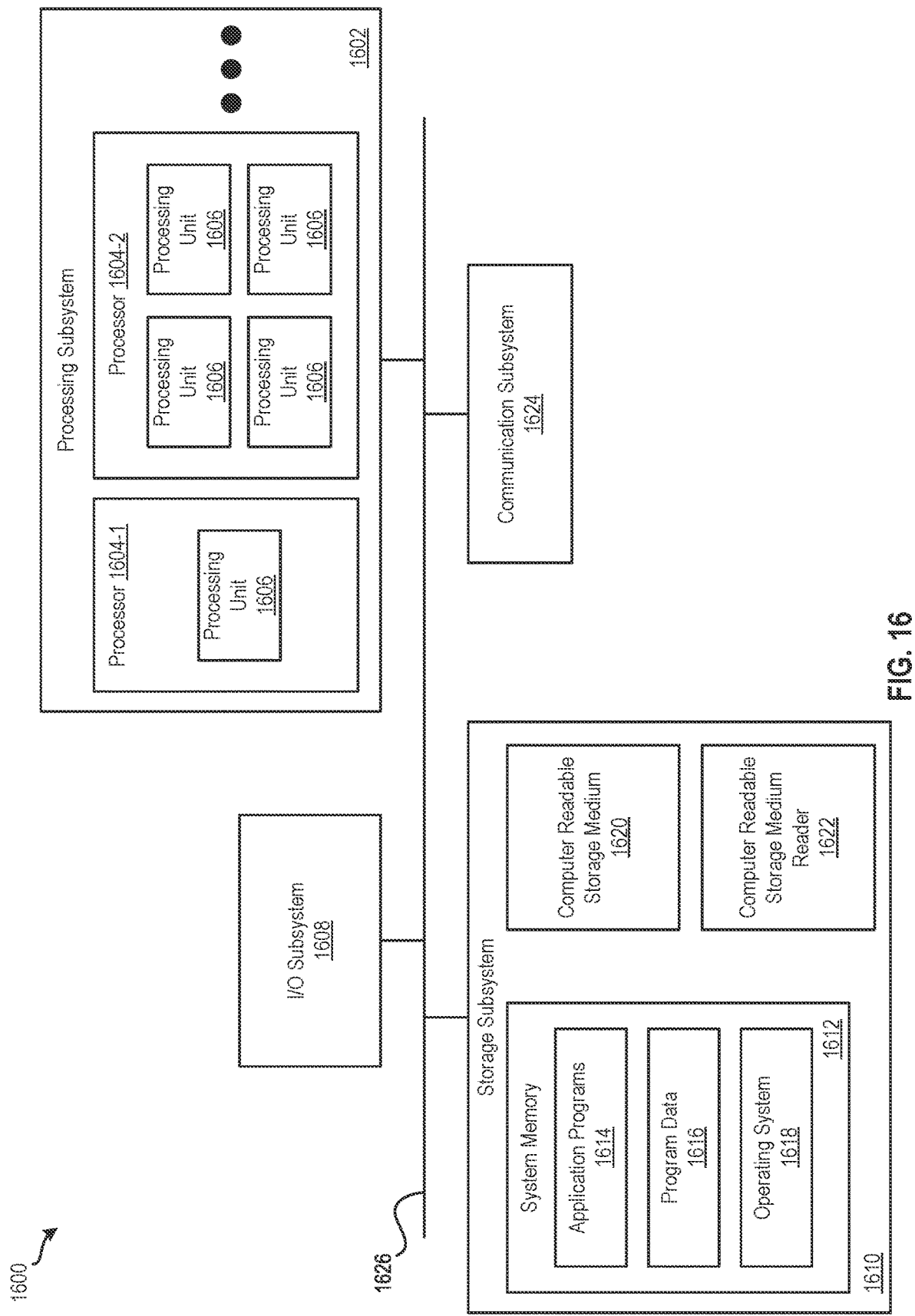
FIG. 16 illustrates an exemplary computer system, in which various embodiments may be implemented.

FIG. 16 illustrates an exemplary computer system 1600 for implementing various embodiments described above. For example, computer system 1600 may be used to implement client device 105 and computing systems 110. Computer system 1600 may be a desktop computer, a laptop, a server computer, or any other type of computer system or combination thereof. Some or all elements of application 115, metadata manager 120, data manager 125, key mapping service 130, or combinations thereof can be included or implemented in computer system 1600. In addition, computer system 1600 can implement many of the operations, methods, and/or processes described above (e.g., process 1500). As shown in FIG. 16, computer system 1600 includes processing subsystem 1602, which communicates, via bus subsystem 1626, with input/output (I/O) subsystem 1608, storage subsystem 1610 and communication subsystem 1624.

Bus subsystem 1626 is configured to facilitate communication among the various components and subsystems of computer system 1600. While bus subsystem 1626 is illustrated in FIG. 16 as a single bus, one of ordinary skill in the art will understand that bus subsystem 1626 may be implemented as multiple buses. Bus subsystem 1626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1602, which can be implemented as one or more integrated circuits (e.g., a conventional microprocessor or microcontroller), controls the operation of computer system 1600. Processing subsystem 1602 may include one or more processors 1604. Each processor 1604 may include one processing unit 1606 (e.g., a single core processor such as processor 1604-1) or several processing units 1606 (e.g., a multicore processor such as processor 1604-2). In some embodiments, processors 1604 of processing subsystem 1602 may be implemented as independent processors while, in other embodiments, processors 1604 of processing subsystem 1602 may be implemented as multiple processors integrate into a single chip or multiple chips. Still, in some embodiments, processors 1604 of processing subsystem 1602 may be implemented as a combination of independent processors and multiple processors integrated into a single chip or multiple chips.

In some embodiments, processing subsystem 1602 can execute a variety of programs or processes in response to program code and can maintain multiple concurrently executing programs or processes. At any given time, some or all of the program code to be executed can reside in processing subsystem 1602 and/or in storage subsystem 1610. Through suitable programming, processing subsystem 1602 can provide various functionalities, such as the functionalities described above by reference to process 1500, etc.

I/O subsystem 1608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1600 to a user or another device (e.g., a printer).

As illustrated in FIG. 16, storage subsystem 1610 includes system memory 1612, computer-readable storage medium 1620, and computer-readable storage medium reader 1622. System memory 1612 may be configured to store software in the form of program instructions that are loadable and executable by processing subsystem 1602 as well as data generated during the execution of program instructions. In some embodiments, system memory 1612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1612 may include different types of memory, such as static random access memory (SRAM) and/or dynamic random access memory (DRAM). System memory 1612 may include a basic input/output system (BIOS), in some embodiments, that is configured to store basic routines to facilitate transferring information between elements within computer system 1600 (e.g., during start-up). Such a BIOS may be stored in ROM (e.g., a ROM chip), flash memory, or any other type of memory that may be configured to store the BIOS.

As shown in FIG. 16, system memory 1612 includes application programs 1614 (e.g., application 115), program data 1616, and operating system (OS) 1618. OS 1618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1620 may be a non-transitory computer-readable medium configured to store software (e.g., programs, code modules, data constructs, instructions, etc.). Many of the components (e.g., application 115, metadata manager 120, data manager 125, and key mapping service 130) and/or processes (e.g., process 1500) described above may be implemented as software that when executed by a processor or processing unit (e.g., a processor or processing unit of processing subsystem 1602) performs the operations of such components and/or processes. Storage subsystem 1610 may also store data used for, or generated during, the execution of the software.

Storage subsystem 1610 may also include computer-readable storage medium reader 1622 that is configured to communicate with computer-readable storage medium 1620. Together and, optionally, in combination with system memory 1612, computer-readable storage medium 1620 may comprehensively represent remote, local, fixed, and/or removable storage devices plus storage media for temporarily and/or more permanently containing, storing, transmitting, and retrieving computer-readable information.

Computer-readable storage medium 1620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1624 serves as an interface for receiving data from, and transmitting data to, other devices, computer systems, and networks. For example, communication subsystem 1624 may allow computer system 1600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1624 may provide components configured for wired communication (e.g., Ethernet) in addition to or instead of components configured for wireless communication.

One of ordinary skill in the art will realize that the architecture shown in FIG. 16 is only an example architecture of computer system 1600, and that computer system 1600 may have additional or fewer components than shown, or a different configuration of components. The various components shown in FIG. 16 may be implemented in hardware, software, firmware or any combination thereof, including one or more signal processing and/or application specific integrated circuits.

Figure 17:
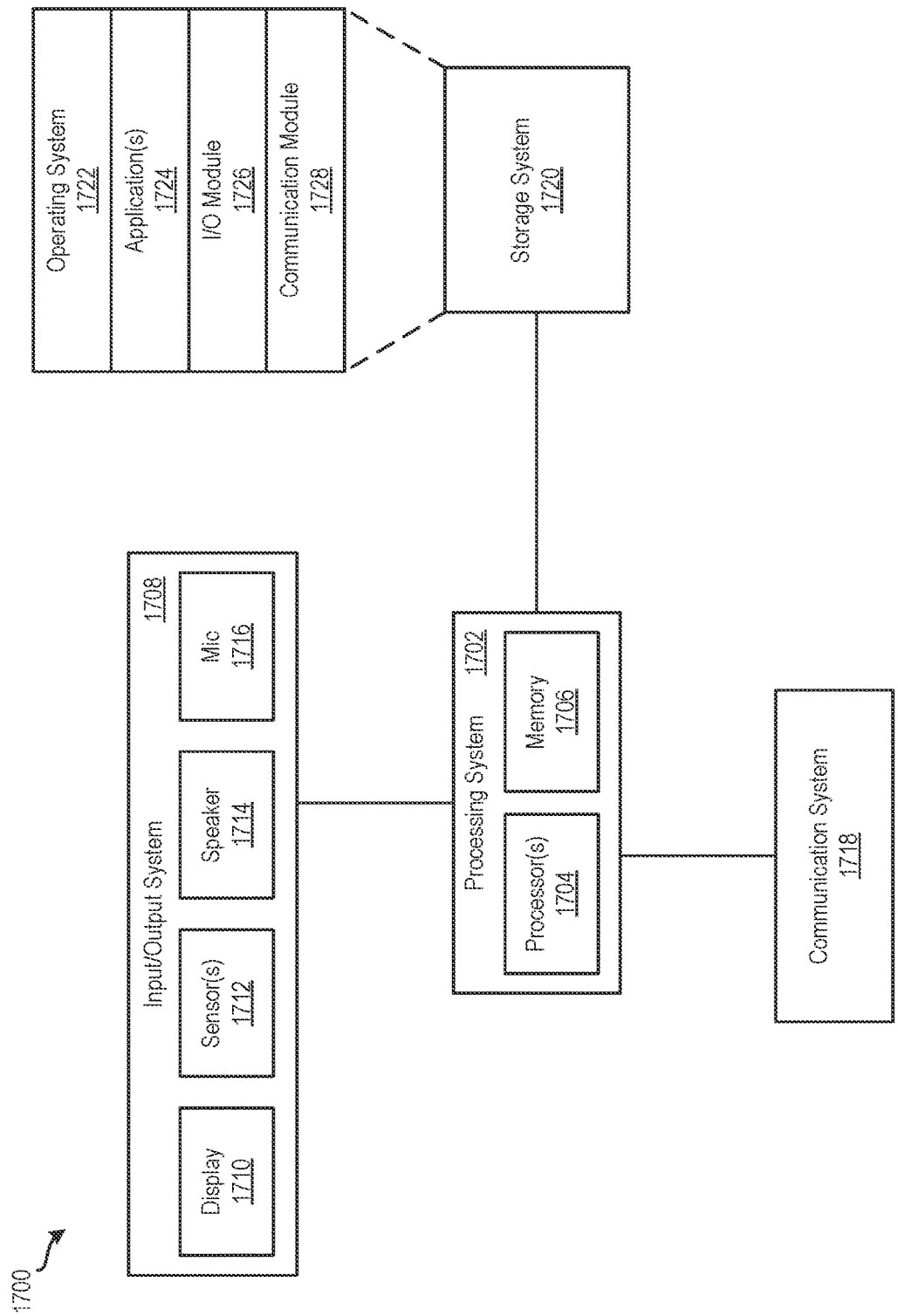
FIG. 17 illustrates an exemplary computing device, in which various embodiments may be implemented.

FIG. 17 illustrates an exemplary computing device 1700 for implementing various embodiments described above. For example, computing device 1700 may be used to implement client devices 105. Computing device 1700 may be a cellphone, a smartphone, a wearable device, an activity tracker or manager, a tablet, a personal digital assistant (PDA), a media player, or any other type of mobile computing device or combination thereof. As shown in FIG. 17, computing device 1700 includes processing system 1702, input/output (I/O) system 1708, communication system 1718, and storage system 1720. These components may be coupled by one or more communication buses or signal lines.

Processing system 1702, which can be implemented as one or more integrated circuits (e.g., a conventional microprocessor or microcontroller), controls the operation of computing device 1700. As shown, processing system 1702 includes one or more processors 1704 and memory 1706. Processors 1704 are configured to run or execute various software and/or sets of instructions stored in memory 1706 to perform various functions for computing device 1700 and to process data.

Each processor of processors 1704 may include one processing unit (e.g., a single core processor) or several processing units (e.g., a multicore processor). In some embodiments, processors 1704 of processing system 1702 may be implemented as independent processors while, in other embodiments, processors 1704 of processing system 1702 may be implemented as multiple processors integrate into a single chip. Still, in some embodiments, processors 1704 of processing system 1702 may be implemented as a combination of independent processors and multiple processors integrated into a single chip.

Memory 1706 may be configured to receive and store software (e.g., operating system 1722, applications 1724, I/O module 1726, communication module 1728, etc. from storage system 1720) in the form of program instructions that are loadable and executable by processors 1704 as well as data generated during the execution of program instructions. In some embodiments, memory 1706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1708 is responsible for receiving input through various components and providing output through various components. As shown for this example, I/O system 1708 includes display 1710, one or more sensors 1712, speaker 1714, and microphone 1716. Display 1710 is configured to output visual information (e.g., a graphical user interface (GUI) generated and/or rendered by processors 1704). In some embodiments, display 1710 is a touch screen that is configured to also receive touch-based input. Display 1710 may be implemented using liquid crystal display (LCD) technology, light-emitting diode (LED) technology, organic LED (OLED) technology, organic electro luminescence (OEL) technology, or any other type of display technologies. Sensors 1712 may include any number of different types of sensors for measuring a physical quantity (e.g., temperature, force, pressure, acceleration, orientation, light, radiation, etc.). Speaker 1714 is configured to output audio information and microphone 1716 is configured to receive audio input. One of ordinary skill in the art will appreciate that I/O system 1708 may include any number of additional, fewer, and/or different components. For instance, I/O system 1708 may include a keypad or keyboard for receiving input, a port for transmitting data, receiving data and/or power, and/or communicating with another device or component, an image capture component for capturing photos and/or videos, etc.

Communication system 1718 serves as an interface for receiving data from, and transmitting data to, other devices, computer systems, and networks. For example, communication system 1718 may allow computing device 1700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1718 may provide components configured for wired communication (e.g., Ethernet) in addition to or instead of components configured for wireless communication.

Storage system 1720 handles the storage and management of data for computing device 1700. Storage system 1720 may be implemented by one or more non-transitory machine-readable mediums that are configured to store software (e.g., programs, code modules, data constructs, instructions, etc.) and store data used for, or generated during, the execution of the software.

In this example, storage system 1720 includes operating system 1722, one or more applications 1724, I/O module 1726, and communication module 1728. Operating system 1722 includes various procedures, sets of instructions, software components and/or drivers for controlling and managing general system tasks (e.g., memory management, storage device control, power management, etc.) and facilitates communication between various hardware and software components. Operating system 1722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1724 can include any number of different applications installed on computing device 1700. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1726 manages information received via input components (e.g., display 1710, sensors 1712, and microphone 1716) and information to be outputted via output components (e.g., display 1710 and speaker 1714). Communication module 1728 facilitates communication with other devices via communication system 1718 and includes various software components for handling data received from communication system 1718.

One of ordinary skill in the art will realize that the architecture shown in FIG. 17 is only an example architecture of computing device 1700, and that computing device 1700 may have additional or fewer components than shown, or a different configuration of components. The various components shown in FIG. 17 may be implemented in hardware, software, firmware or any combination thereof, including one or more signal processing and/or application specific integrated circuits.

Figure 18:
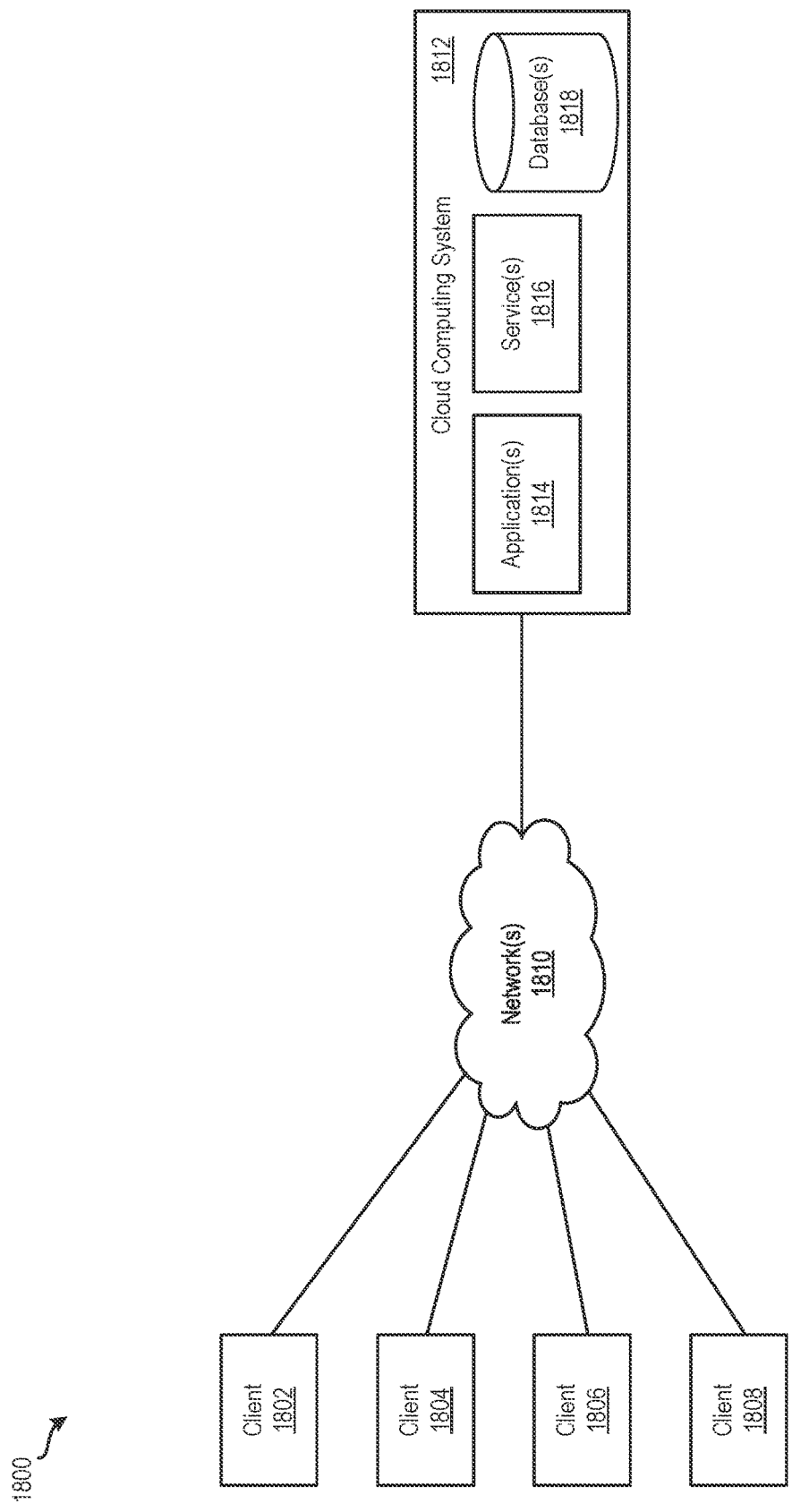
FIG. 18 illustrates an exemplary system, in which various embodiments may be implemented.

FIG. 18 illustrates an exemplary system 1800 for implementing various embodiments described above. For example, any of the client devices 1802-1808 may be used to implement client device 105 and cloud computing system 1812 may be used to implement computing system 110. As shown, system 1800 includes client devices 1802-1808, one or more networks 1810, and cloud computing system 1812. Cloud computing system 1812 is configured to provide resources and data to client devices 1802-1808 via networks 1810. In some embodiments, cloud computing system 1800 provides resources to any number of different users (e.g., customers, tenants, organizations, etc.). Cloud computing system 1812 may be implemented by one or more computer systems (e.g., servers), virtual machines operating on a computer system, or a combination thereof.

As shown, cloud computing system 1812 includes one or more applications 1814, one or more services 1816, and one or more databases 1818. Cloud computing system 1800 may provide applications 1814, services 1816, and databases 1818 to any number of different customers in a self-service, subscription-based, elastically scalable, reliable, highly available, and secure manner.

In some embodiments, cloud computing system 1800 may be adapted to automatically provision, manage, and track a customer's subscriptions to services offered by cloud computing system 1800. Cloud computing system 1800 may provide cloud services via different deployment models. For example, cloud services may be provided under a public cloud model in which cloud computing system 1800 is owned by an organization selling cloud services and the cloud services are made available to the general public or different industry enterprises. As another example, cloud services may be provided under a private cloud model in which cloud computing system 1800 is operated solely for a single organization and may provide cloud services for one or more entities within the organization. The cloud services may also be provided under a community cloud model in which cloud computing system 1800 and the cloud services provided by cloud computing system 1800 are shared by several organizations in a related community. The cloud services may also be provided under a hybrid cloud model, which is a combination of two or more of the aforementioned different models.

In some instances, any one of applications 1814, services 1816, and databases 1818 made available to client devices 1802-1808 via networks 1810 from cloud computing system 1812 is referred to as a "cloud service." Typically, servers and systems that make up cloud computing system 1812 are different from the on-premises servers and systems of a customer. For example, cloud computing system 1812 may host an application and a user of one of client devices 1802-1808 may order and use the application via networks 1810.

Applications 1814 may include software applications that are configured to execute on cloud computing system 1812 (e.g., a computer system or a virtual machine operating on a computer system) and be accessed, controlled, managed, etc. via client devices 1802-1808. In some embodiments, applications 1814 may include server applications and/or mid-tier applications (e.g., HTTP (hypertext transport protocol) server applications, FTP (file transfer protocol) server applications, CGI (common gateway interface) server applications, JAVA server applications, etc.). Services 1816 are software components, modules, application, etc. that are configured to execute on cloud computing system 1812 and provide functionalities to client devices 1802-1808 via networks 1810. Services 1816 may be web-based services or on-demand cloud services.

Databases 1818 are configured to store and/or manage data that is accessed by applications 1814, services 1816, and/or client devices 1802-1808. For instance, storages 135-150 may be stored in databases 1818. Databases 1818 may reside on a non-transitory storage medium local to (and/or resident in) cloud computing system 1812, in a storage-area network (SAN), on a non-transitory storage medium local located remotely from cloud computing system 1812. In some embodiments, databases 1818 may include relational databases that are managed by a relational database management system (RDBMS). Databases 1818 may be a column-oriented databases, row-oriented databases, or a combination thereof. In some embodiments, some or all of databases 1818 are in-memory databases. That is, in some such embodiments, data for databases 1818 are stored and managed in memory (e.g., random access memory (RAM)).

Client devices 1802-1808 are configured to execute and operate a client application (e.g., a web browser, a proprietary client application, etc.) that communicates with applications 1814, services 1816, and/or databases 1818 via networks 1810. This way, client devices 1802-1808 may access the various functionalities provided by applications 1814, services 1816, and databases 1818 while applications 1814, services 1816, and databases 1818 are operating (e.g., hosted) on cloud computing system 1800. Client devices 1802-1808 may be computer system 1600 or computing device 1700, as described above by reference to FIGS. 16 and 17, respectively. Although system 1800 is shown with four client devices, any number of client devices may be supported.

Networks 1810 may be any type of network configured to facilitate data communications among client devices 1802-1808 and cloud computing system 1812 using any of a variety of network protocols. Networks 1810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
receiving a metadata model definition defining a data model including a set of entities, the metadata model definition comprising a set of entity definitions specifying the set of entities, fields for each entity of the set of entities, and datatypes for each of the fields, a set of semantic key definitions specifying a set of semantic keys associated with the set of entities, and a set of relationship definitions specifying a set of relationships between the set of entities, wherein the set of semantic keys are configured to be used by an application to refer to the set of entities;
determining a set of technical keys for the set of entities, wherein the set of technical keys are configured to be used by the device to refer to the set of entities;
storing the metadata model definition and the set of technical keys in a set of records;
storing a set of mappings that map technical keys to semantic keys;
receiving a set of changes to the metadata model definition, wherein the set of changes includes a modification to a datatype of a field of an entity in the set of entities;
accessing an entity definition for the entity being modified from among the set of entity definitions in the stored metadata model definition;
determining, using the accessed entity definition, that the field of the entity is a semantic key for the entity;
retrieving a technical key from the stored set of mappings using the determined semantic key;
modifying the metadata model definition based on the retrieved technical key and the set of changes to form a second metadata model definition; and
storing the second metadata model definition in a second set of records.

2. The non-transitory machine-readable medium of claim 1, wherein the set of changes further includes an addition of a transformation rule to the entity.

3. The non-transitory machine-readable medium of claim 2, wherein the program further comprises sets of instructions for:
applying the transformation rule to a first record of an instance of the entity in order;
generating a second record of the instance of the entity; and
storing in the second record of the instance of the entity results generated from applying the transformation rules to the first record of the instance of the entity.

4. The non-transitory machine-readable medium of claim 1, wherein the set of changes includes a replacement of a first field of an entity with a second field and an addition of a validity rule to the entity.

5. The non-transitory machine-readable medium of claim 1, wherein storing the metadata model definition in the set of records comprises storing each entity definition in the set of entity definitions in a record in the set of records.

6. The non-transitory machine-readable medium of claim 1, wherein determining the set of technical keys for the set of entities comprises randomly determining a value for each entity in the set of entities.

7. A method comprising:
receiving a metadata model definition defining a data model including a set of entities, the metadata model definition comprising a set of entity definitions specifying the set of entities, fields for each entity of the set of entities, and datatypes for each of the fields, a set of semantic key definitions specifying a set of semantic keys associated with the set of entities, and a set of relationship definitions specifying a set of relationships between the set of entities, wherein the set of semantic keys are configured to be used by an application to refer to the set of entities;
determining a set of technical keys for the set of entities, wherein the set of technical keys are configured to be used by the device to refer to the set of entities;
storing the metadata model definition and the set of technical keys in a set of records;
storing a set of mappings that map technical keys to semantic keys;
receiving a set of changes to the metadata model definition, wherein the set of changes includes a modification to a datatype of a field of an entity in the set of entities;
accessing an entity definition for the entity being modified from among the set of entity definitions in the stored metadata model definition;

determining, using the accessed entity definition, that the field of the entity is a semantic key for the entity;

retrieving a technical key from the stored set of mappings using the determined semantic key;

modifying the metadata model definition based on the retrieved technical key and the set of changes to form a second metadata model definition; and storing the second metadata model definition in a second set of records.

8. The method of claim 7, wherein the set of changes further includes an addition of a transformation rule to the entity.

9. The method of claim 8 further comprising:

applying the transformation rule to a first record of an instance of the entity in order;

generating a second record of the instance of the entity; and storing in the second record of the instance of the entity results generated from applying the transformation rules to the first record of the instance of the entity.

10. The method of claim 7, wherein the set of changes includes a replacement of a first field of an entity with a second field and an addition of a validity rule to the entity.

11. The method of claim 7, wherein storing the metadata model definition in the set of records comprises storing each entity definition in the set of entity definitions in a record in the set of records.

12. The method of claim 7, wherein determining the set of technical keys for the set of entities comprises randomly determining a value for each entity in the set of entities.

13. A system comprising:

a set of processing units; and a non-transitory machine-readable medium storing instructions that when executed by at least one processing unit in the set of processing units cause the at least one processing unit to:

receive a metadata model definition defining a data model including a set of entities, the metadata model definition comprising a set of entity definitions specifying the set of entities, fields for each entity of the set of entities, and datatypes for each of the fields, a set of semantic key definitions specifying a set of semantic keys associated with the set of entities, and a set of relationship definitions specifying a set of relationships between the set of entities, wherein the set of semantic keys are configured to be used by an application to refer to the set of entities;

determine a set of technical keys for the set of entities, wherein the set of technical keys are configured to be used by the device to refer to the set of entities;

store the metadata model definition and the set of technical keys in a first set of records;

store a set of mappings that map technical keys to semantic keys;

receive a set of changes to the metadata model definition, wherein the set of changes includes a modification to a datatype of a field of an entity in the set of entities;

accessing an entity definition for the entity being modified from among the set of entity definitions in the stored metadata model definition;

determining, using the access entity definition, that the field of the entity is a semantic key for the entity;

retrieving a technical key from the stored set of mappings using the determined semantic key;

modify the metadata model based on the set of changes to form a second metadata model definition; and store the second metadata model definition in a second set of records.

14. The system of claim 13, wherein the set of changes further includes an addition of a transformation rule to the entity.

15. The system of claim 14, wherein the instructions further cause the at least one processing unit to:

apply the transformation rule to a first record of an instance of the entity in order;

generate a second record of the instance of the entity; and store in the second record of the instance of the entity results generated from applying the transformation rules to the first record of the instance of the entity.

16. The system of claim 13, wherein the set of changes includes a replacement of a first field of an entity with a second field and an addition of a validity rule to the entity.

17. The system of claim 13, wherein storing the metadata model definition in the first set of records comprises storing each entity definition in the set of entity definitions in a record in the first set of records.

18. The system of claim 13, wherein determining the set of technical keys for the set of entities comprises randomly determining a value for each entity in the set of entities.

19. The non-transitory machine-readable medium of claim 1, wherein the set of changes to the metadata model definition are received from a user of a client device as input to a field of a form in a graphical user interface.

20. The non-transitory machine-readable medium of claim 1, wherein the program further comprises sets of instructions for:

determining that a set of records is not active and outdated;

move the set of records to a secondary storage; and change the status of the set of records to indicate they are archived.

\* \* \* \* \*